United States Patent
Teranishi et al.

(10) Patent No.: US 10,082,923 B2
(45) Date of Patent: *Sep. 25, 2018

(54) TOUCH SENSOR, DISPLAY AND ELECTRONIC DEVICE

(71) Applicant: Japan Display Inc., Tokyo (JP)

(72) Inventors: Yasuyuki Teranishi, Aichi (JP); Koji Noguchi, Kanagawa (JP); Koji Ishizaki, Aichi (JP); Takeya Takeuchi, Aichi (JP); Takayuki Nakanishi, Aichi (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,756

(22) Filed: Feb. 13, 2018

(65) Prior Publication Data

US 2018/0239460 A1 Aug. 23, 2018

Related U.S. Application Data

(63) Continuation of application No. 13/056,315, filed as application No. PCT/JP2010/059294 on May 26, 2010, now Pat. No. 9,927,925.

(30) Foreign Application Priority Data

May 29, 2009 (JP) ................. 2009-131091

(51) Int. Cl.
G06F 3/044 (2006.01)
G06F 3/041 (2006.01)

(52) U.S. Cl.
CPC ............ G06F 3/044 (2013.01); G06F 3/0412 (2013.01)

(58) Field of Classification Search
CPC .................. G06F 3/044; G06F 3/0412
See application file for complete search history.

(56) References Cited

U.S. PATENT DOCUMENTS

| 5,357,266 A | 10/1994 | Tagawa |
| 5,592,197 A | 1/1997 | Tagawa |
| (Continued) | | |

FOREIGN PATENT DOCUMENTS

| JP | 61-084729 | 4/1986 |
| JP | 6-222873 | 8/1994 |
| (Continued) | | |

OTHER PUBLICATIONS

Japanese Office Action dated Feb. 20, 2014 for corresponding Japanese Appln. No. 2011-504252.

*Primary Examiner* — Lisa Landis
(74) *Attorney, Agent, or Firm* — K&L Gates LLP

(57) ABSTRACT

A capacitive type touch sensor appropriately detecting an object, and a display and an electronic device including such a touch sensor are provided. The display including a drive electrode receiving a drive signal, a detection electrode located adjacent to the drive electrode, and a dielectric material located between the drive electrode and the detection electrode defining a capacitive area. The detection electrode generates an output signal driven by the drive signal, a detection circuit electrically connected to the detection electrode sensing the output signal. A switch element is electrically connected between the detection electrode and a voltage source providing a predefined voltage level and having a first state and a second state. A display control circuit controls a voltage applied between a display common voltage electrode and a pixel electrode to display an image based on an image signal, and the display common voltage electrode serves as the drive electrode.

14 Claims, 22 Drawing Sheets

(56) References Cited

U.S. PATENT DOCUMENTS

| | | | |
|---|---|---|---|
| 2004/0178434 A1 | 9/2004 | Kato et al. | |
| 2007/0176868 A1* | 8/2007 | Lee | G02F 1/13306 345/87 |
| 2008/0062140 A1* | 3/2008 | Hotelling | G09G 3/3648 345/173 |
| 2008/0165158 A1 | 7/2008 | Hotelling et al. | |
| 2008/0224971 A1 | 9/2008 | Utsunomiya et al. | |
| 2009/0273578 A1 | 11/2009 | Kanda et al. | |
| 2009/0284492 A1 | 11/2009 | Chino | |
| 2010/0139991 A1* | 6/2010 | Philipp | G06F 3/0418 178/18.06 |

FOREIGN PATENT DOCUMENTS

| | | |
|---|---|---|
| JP | 8-030376 | 2/1996 |
| JP | 9-120334 | 5/1997 |
| JP | 11-039093 | 2/1999 |
| JP | 2000-148376 | 5/2000 |
| JP | 2004-295881 | 10/2004 |
| JP | 2008-9750 | 1/2008 |
| WO | 2007/146780 | 12/2007 |

* cited by examiner

[FIG. 1]
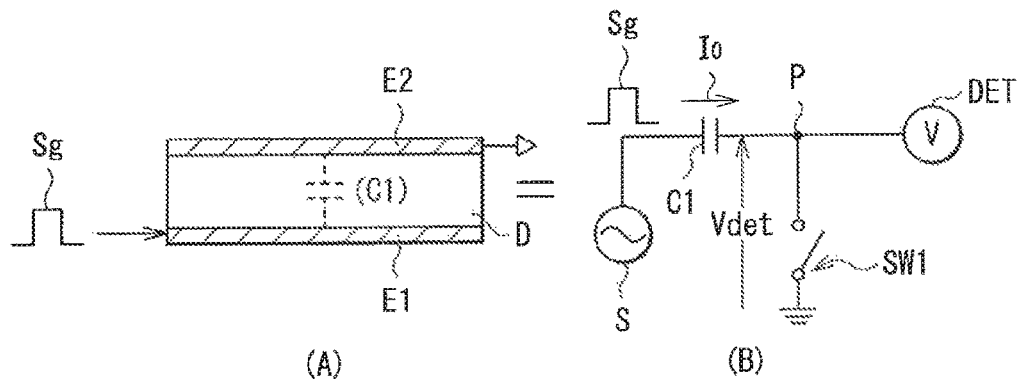
[FIG. 2]
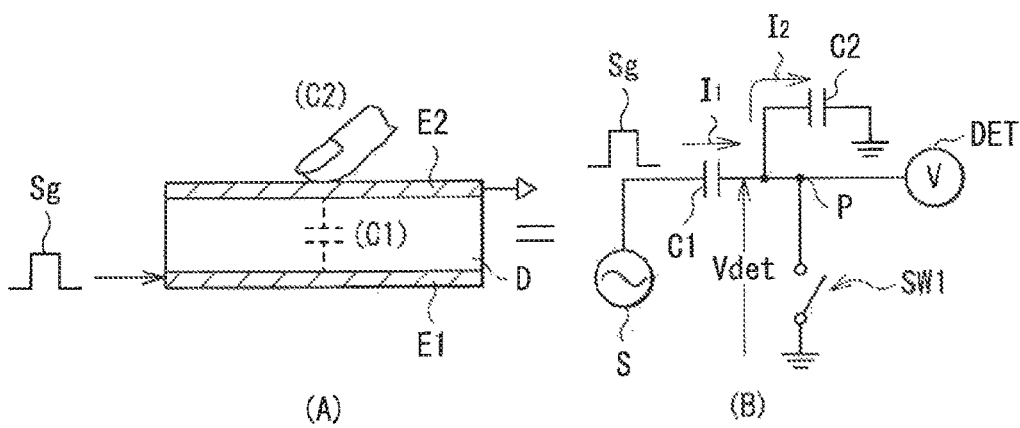
[FIG. 3]
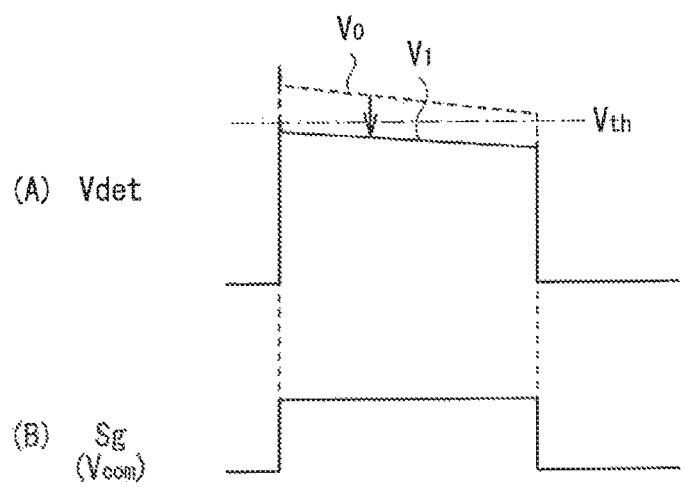

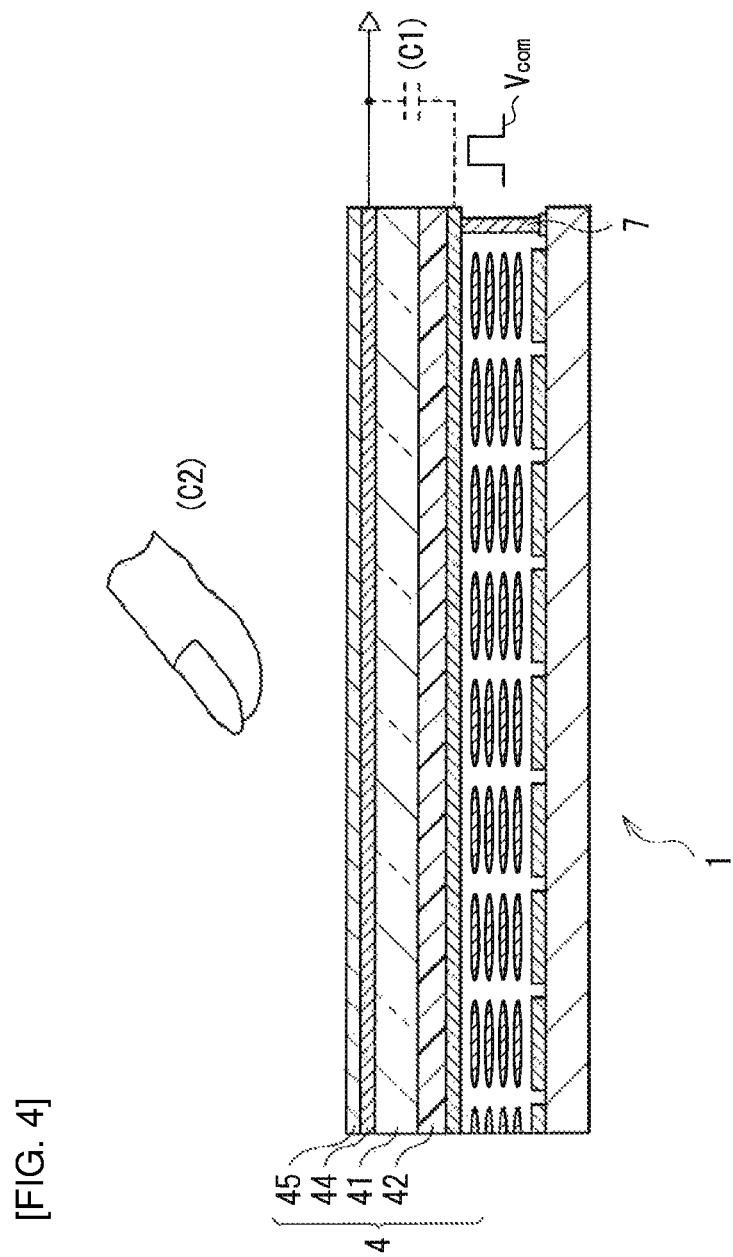

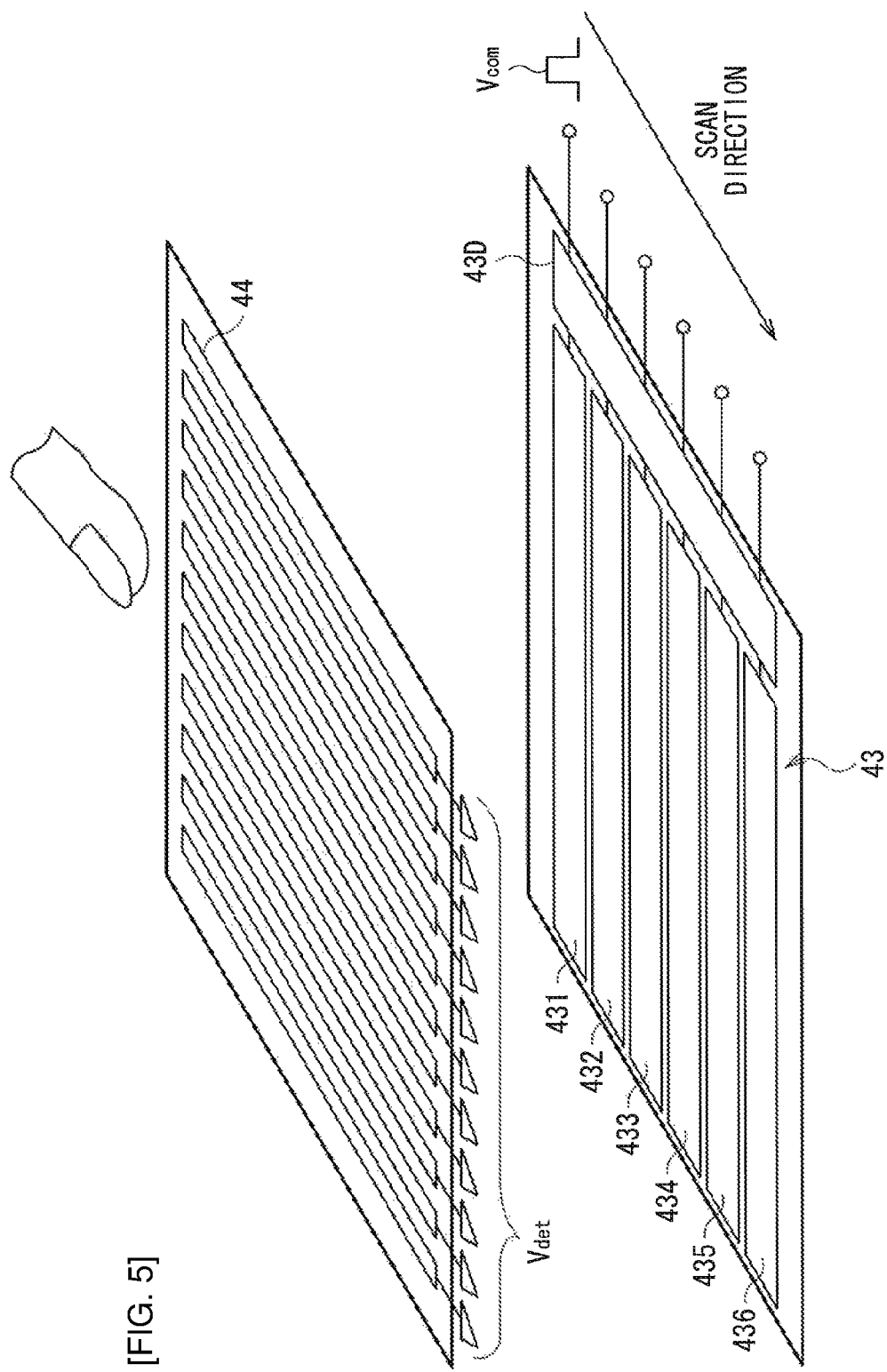
[FIG. 5]

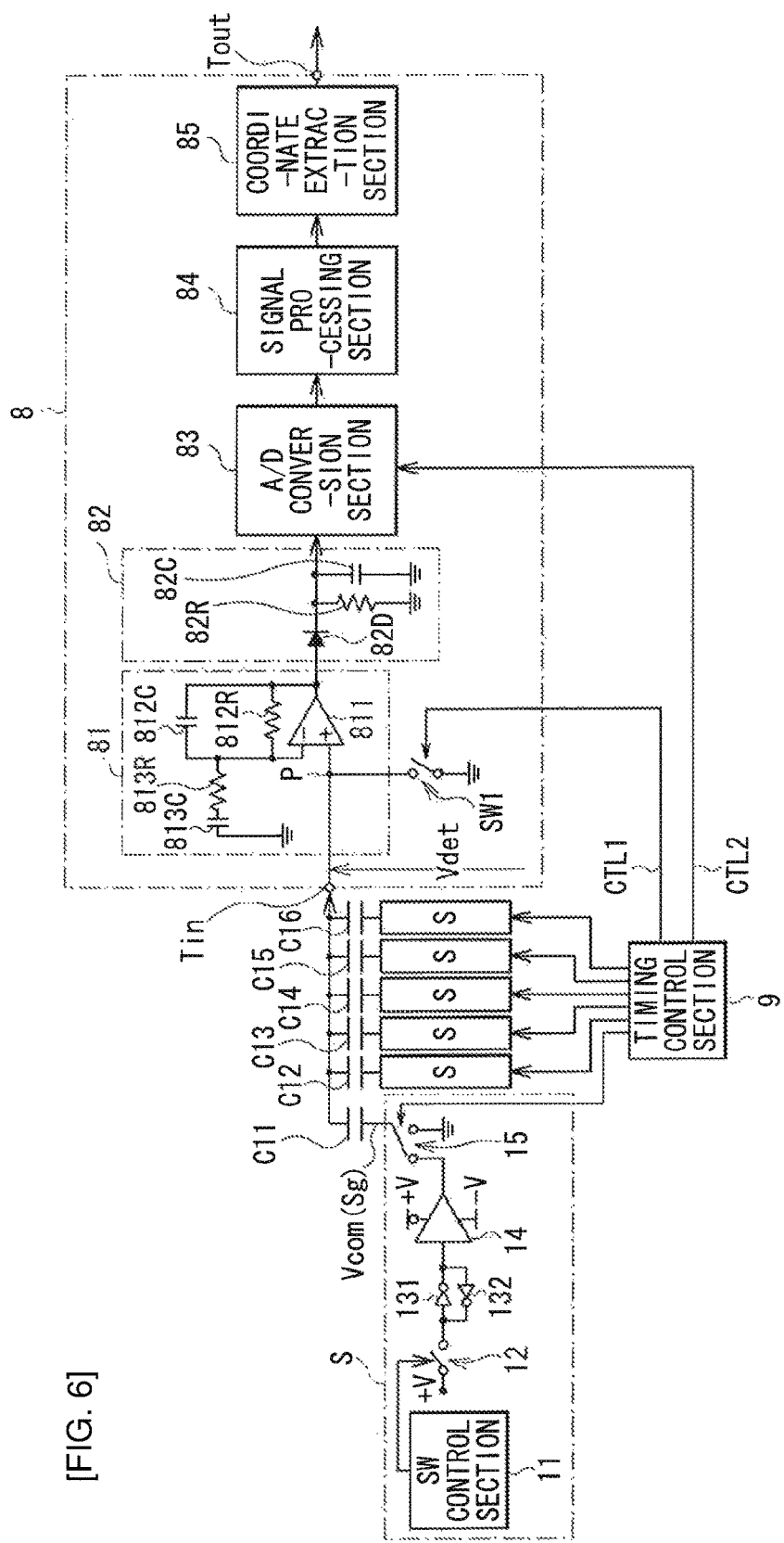
[FIG. 6]

[FIG. 7]
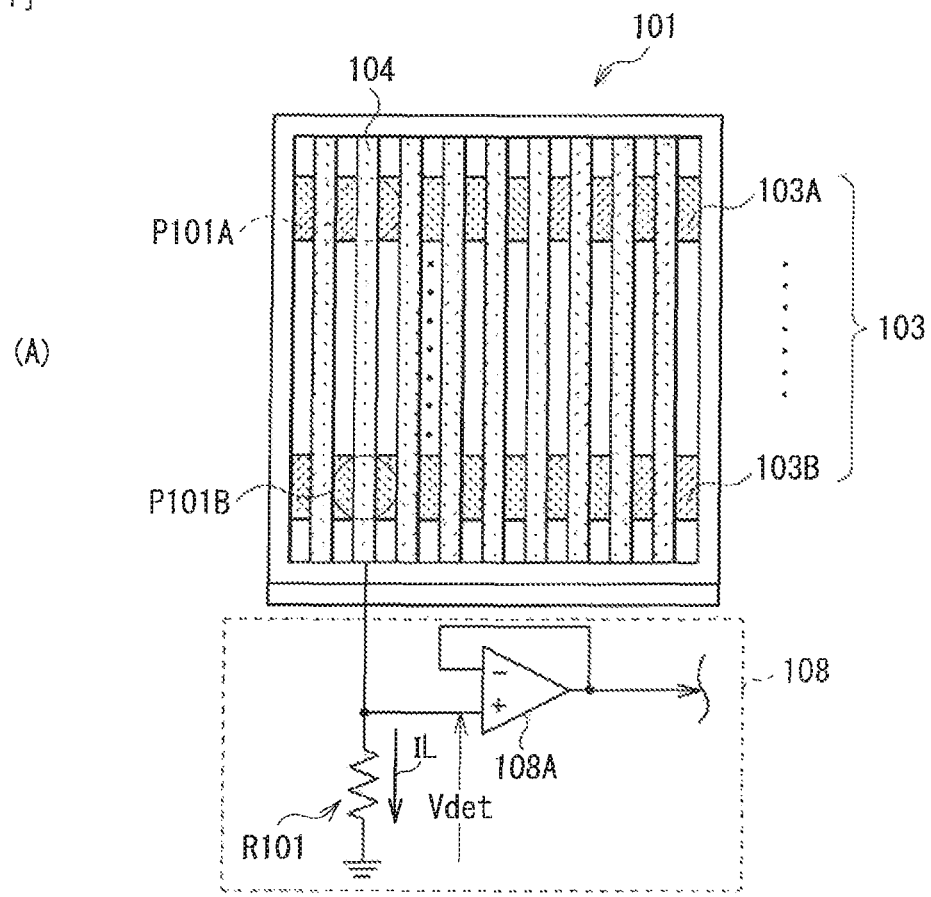
(A)
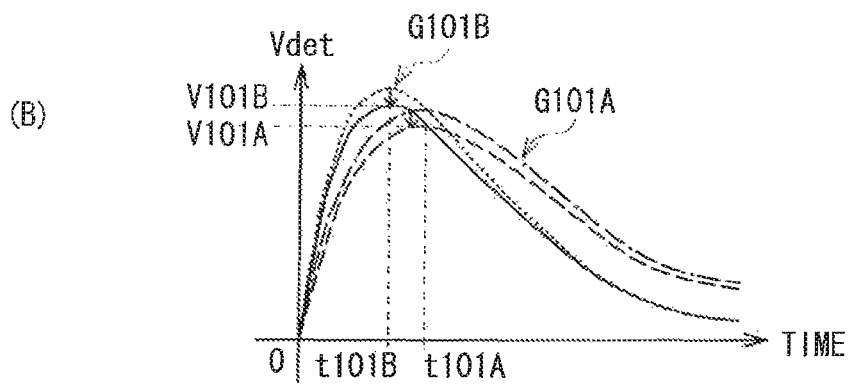
(B)

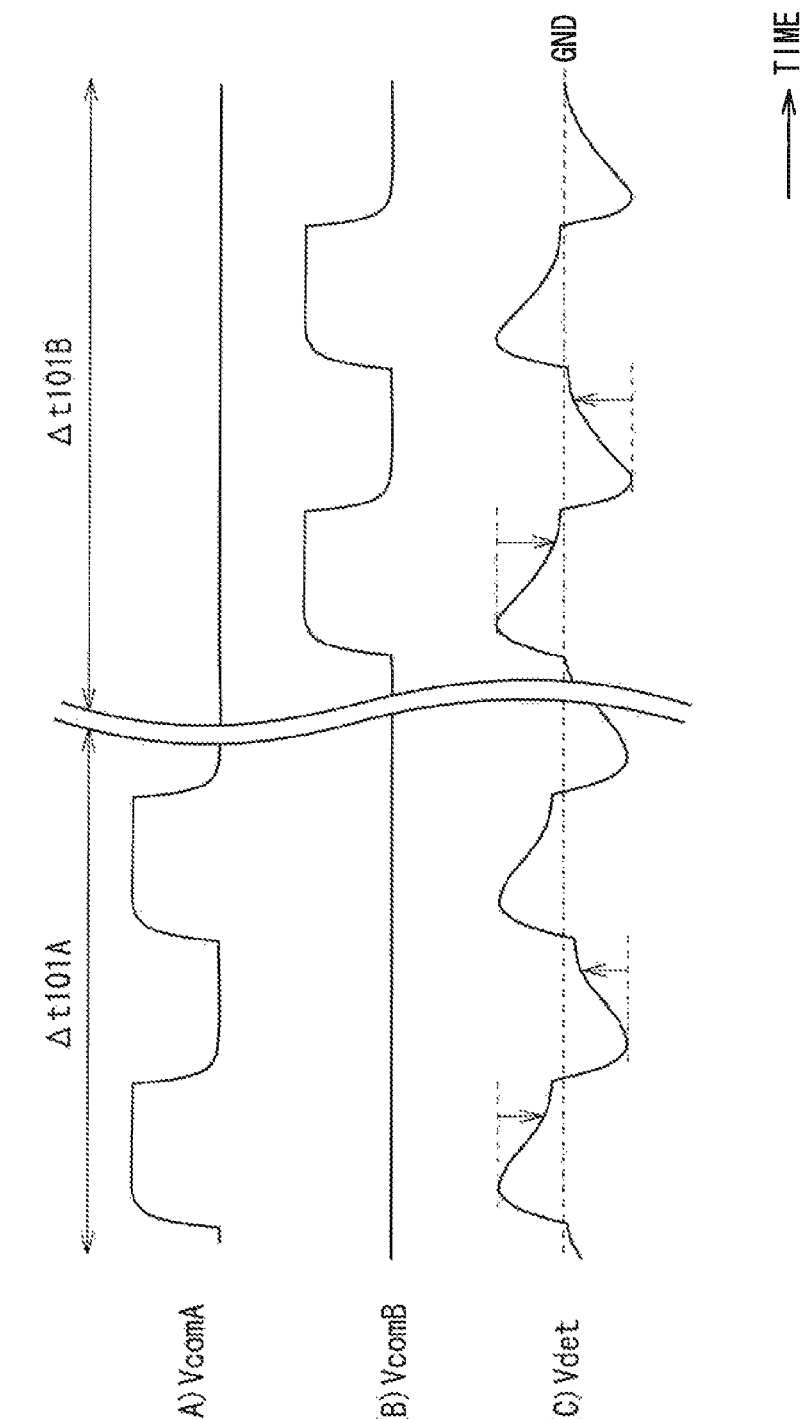

[FIG. 9]
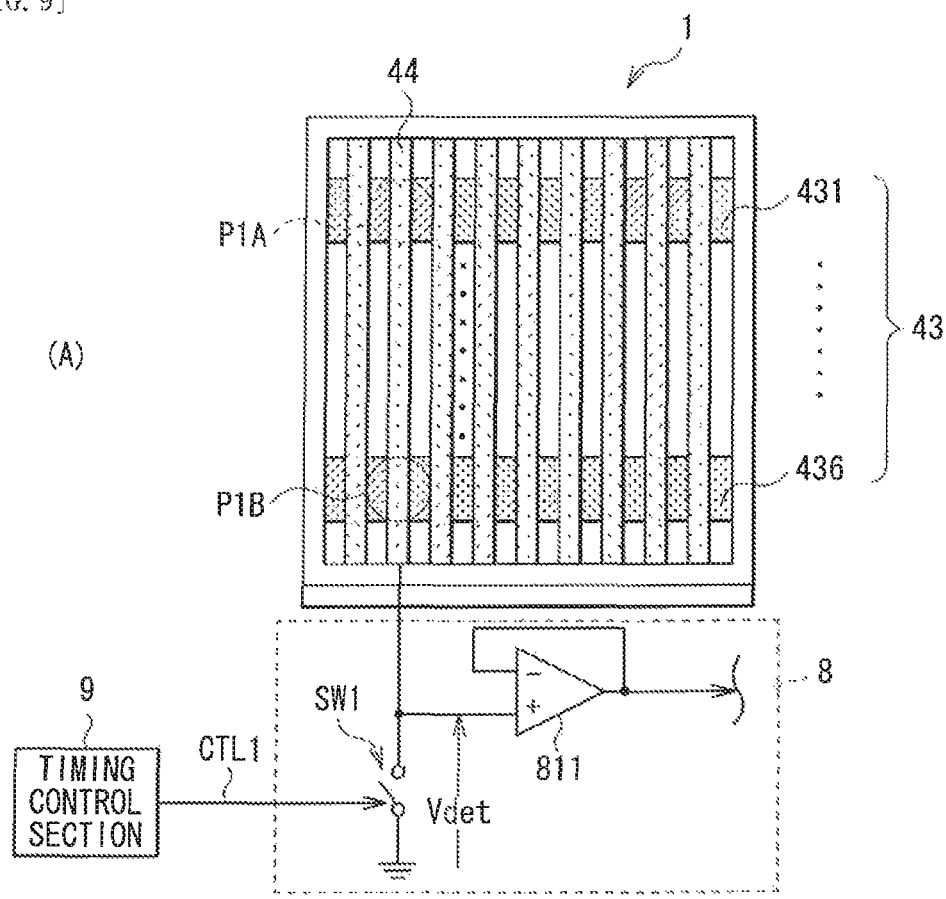
(A)
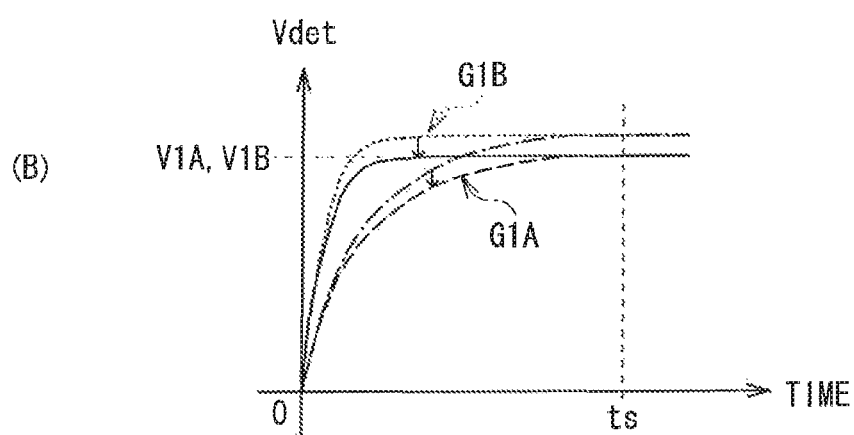
(B)

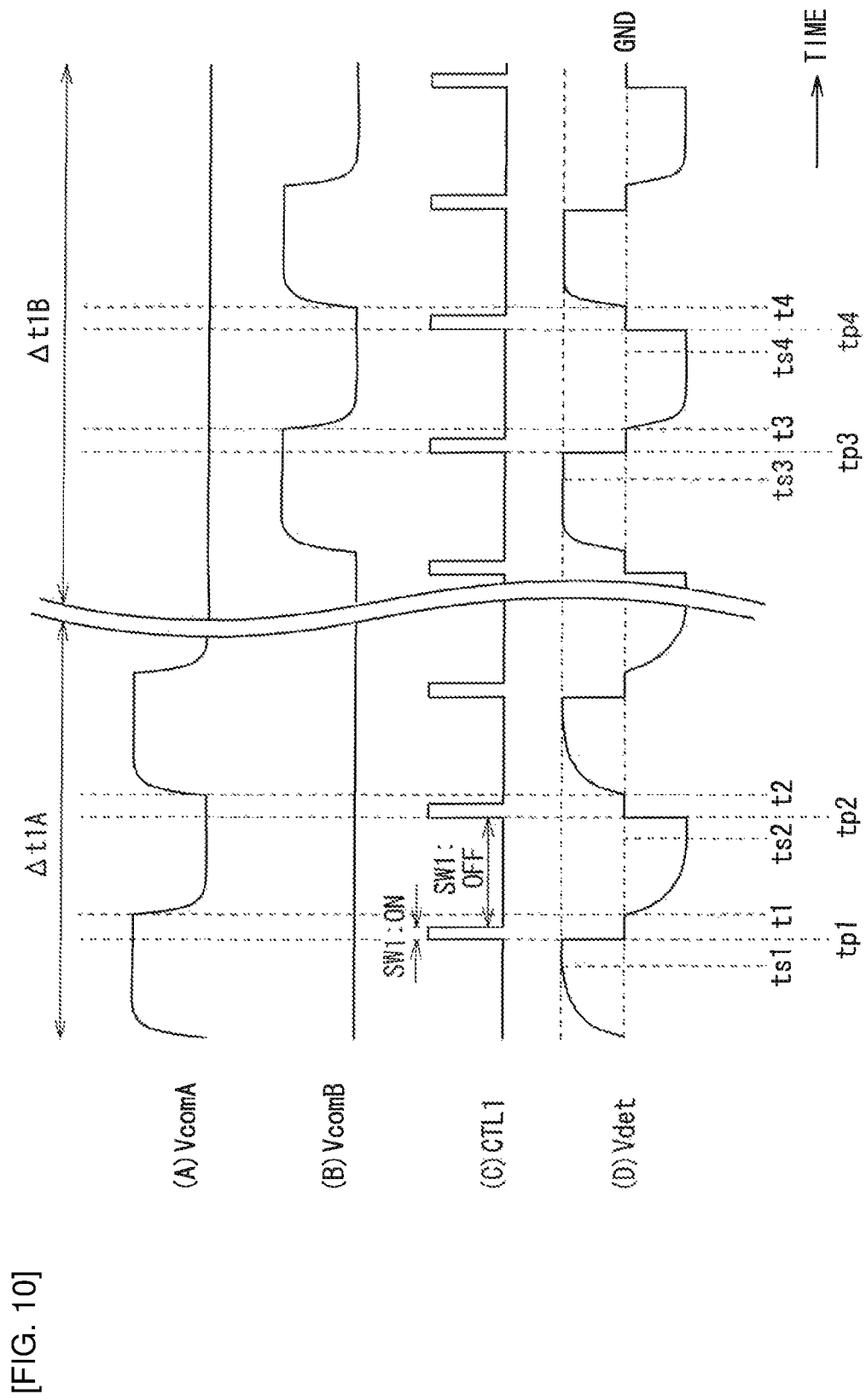
[FIG. 10]

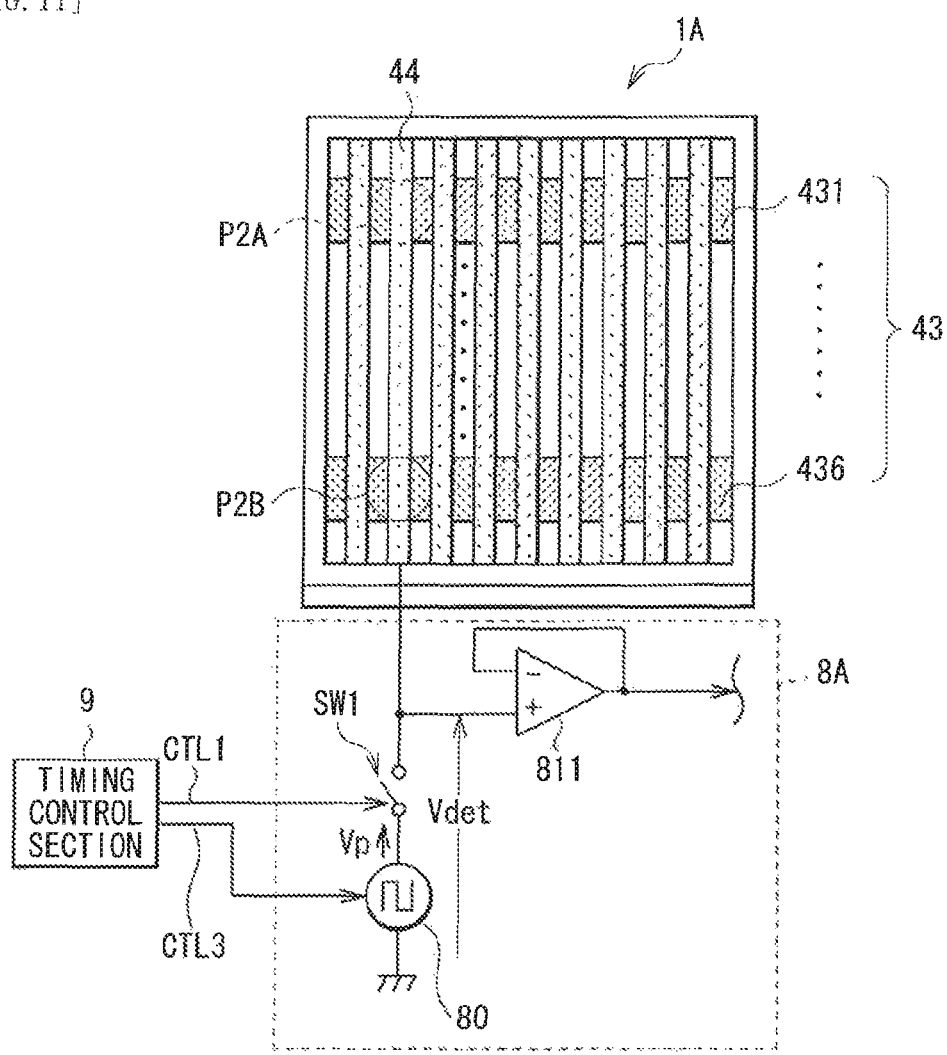
[FIG. 11]

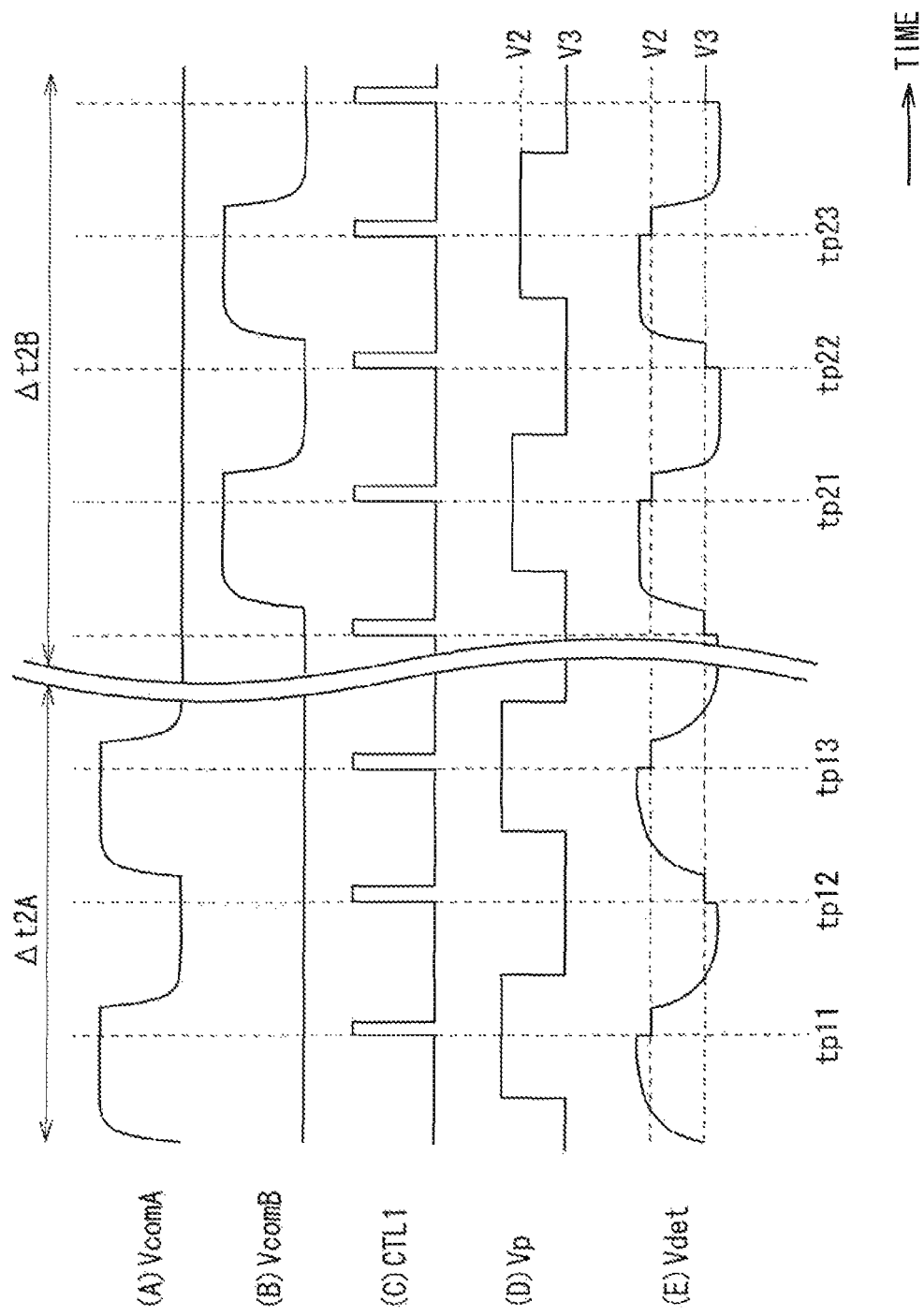
[FIG. 12]

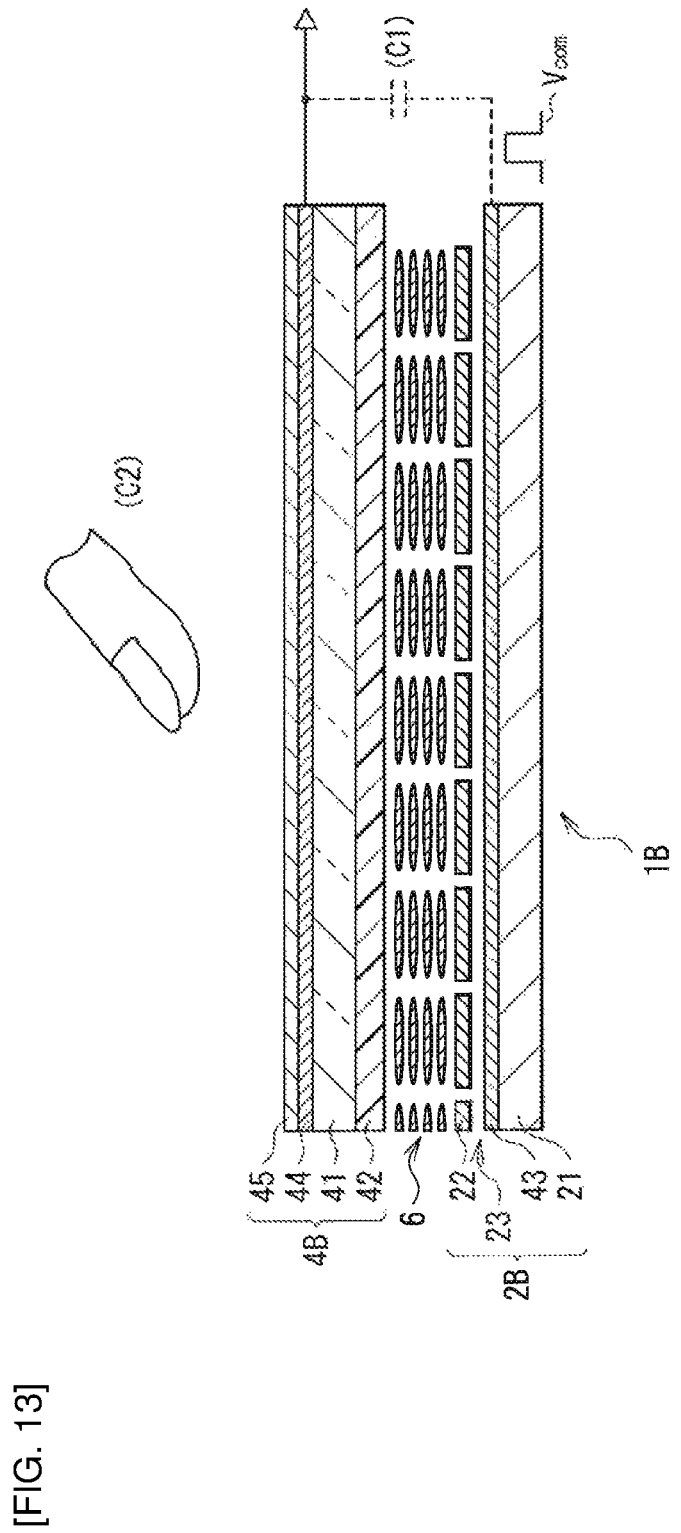
[FIG. 13]

[FIG. 14]
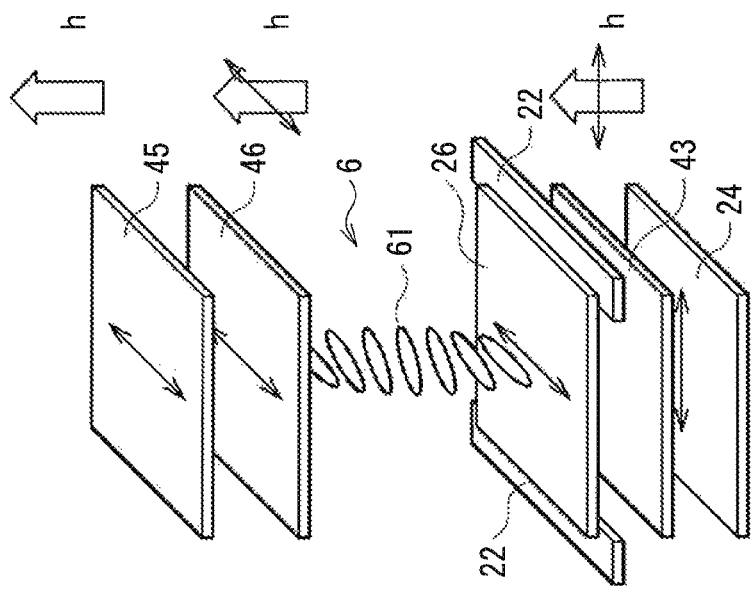
(A) NO VOLTAGE APPLIED (BLACK)
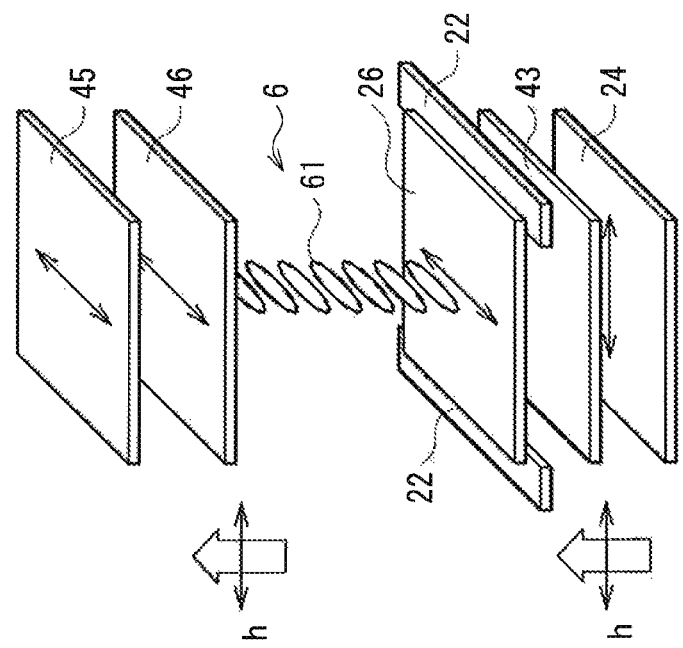
(B) VOLTAGE APPLIED (WHITE)

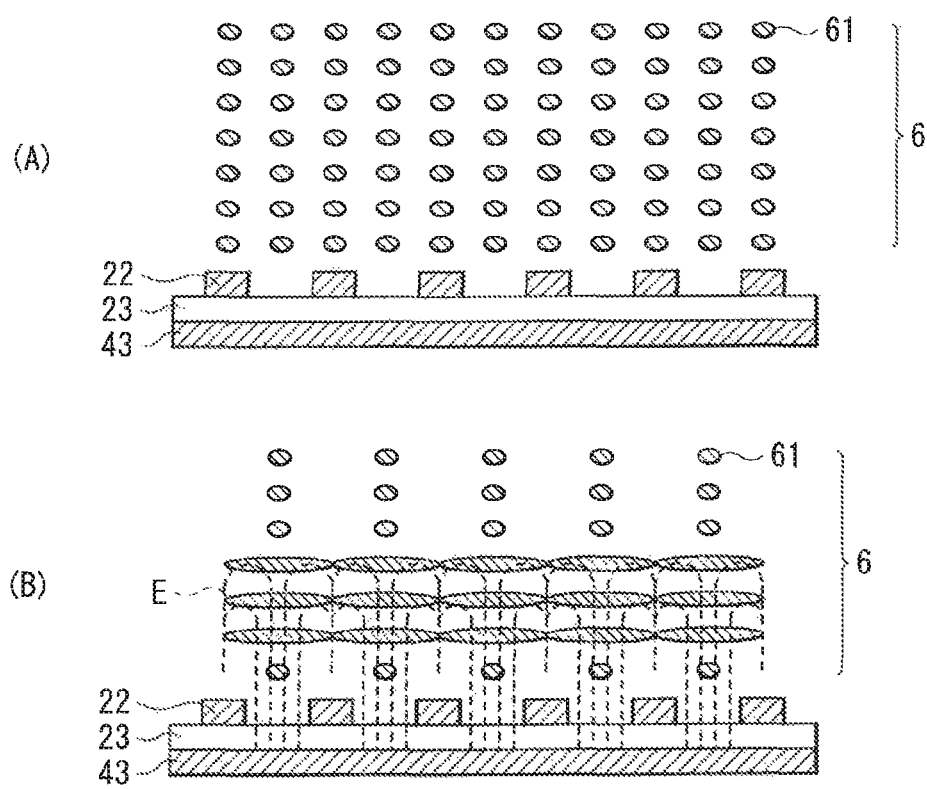
[FIG. 15]

[FIG. 16]
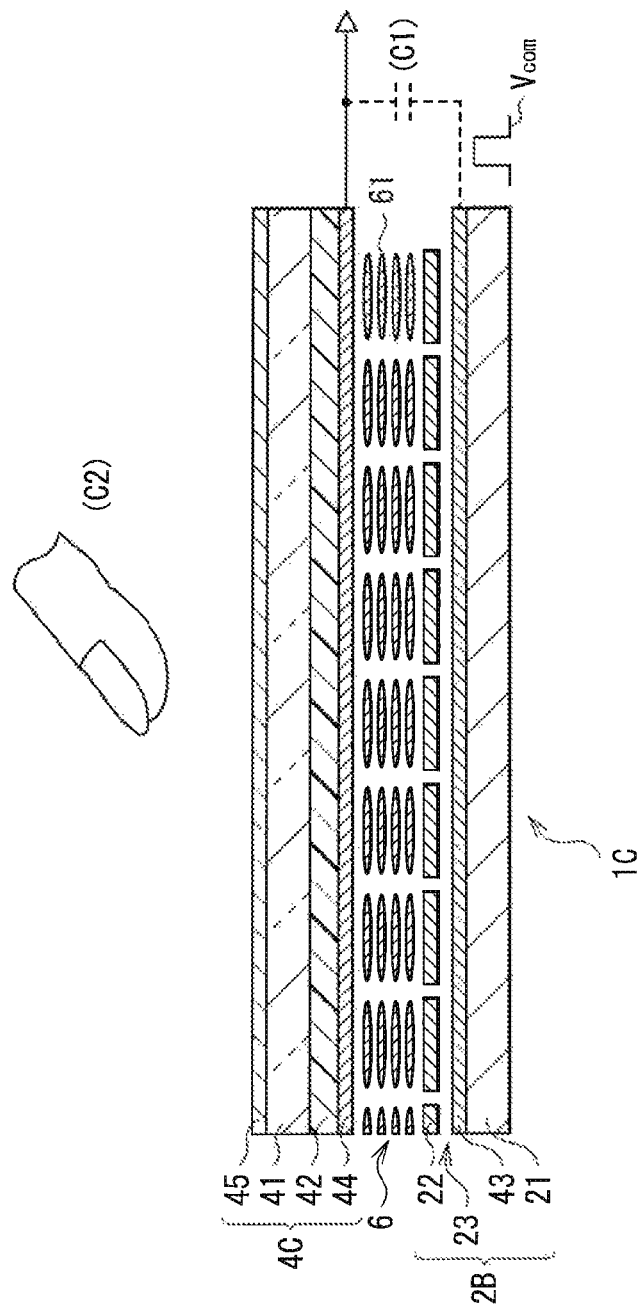

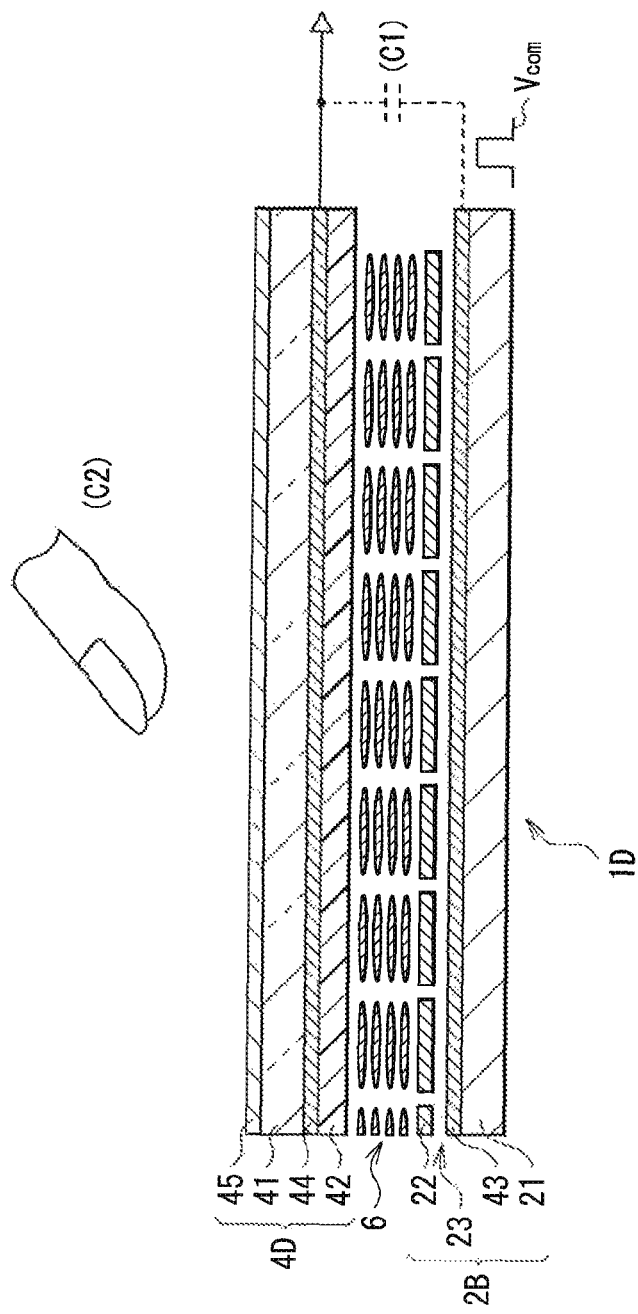
[FIG. 17]

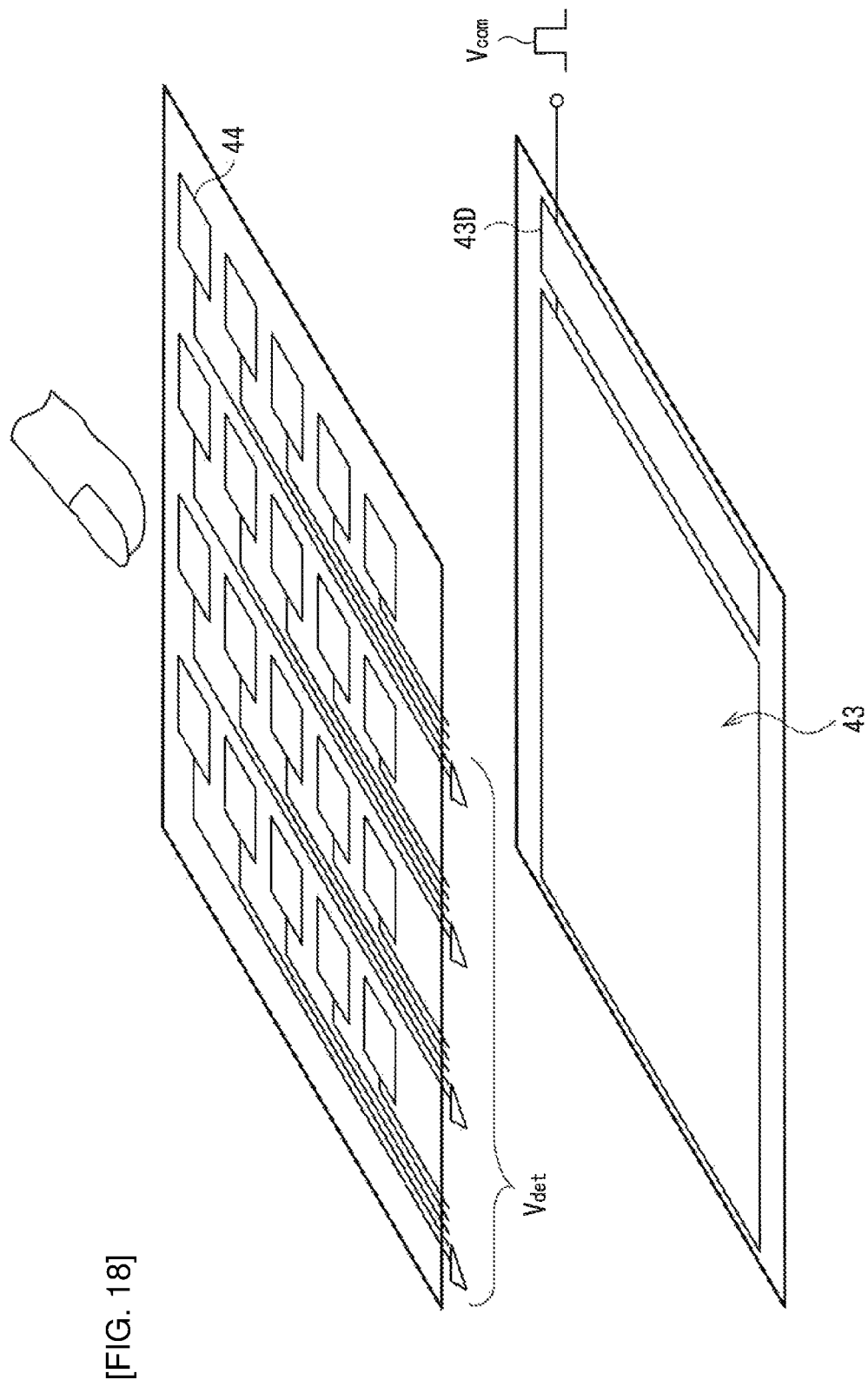
[FIG. 18]

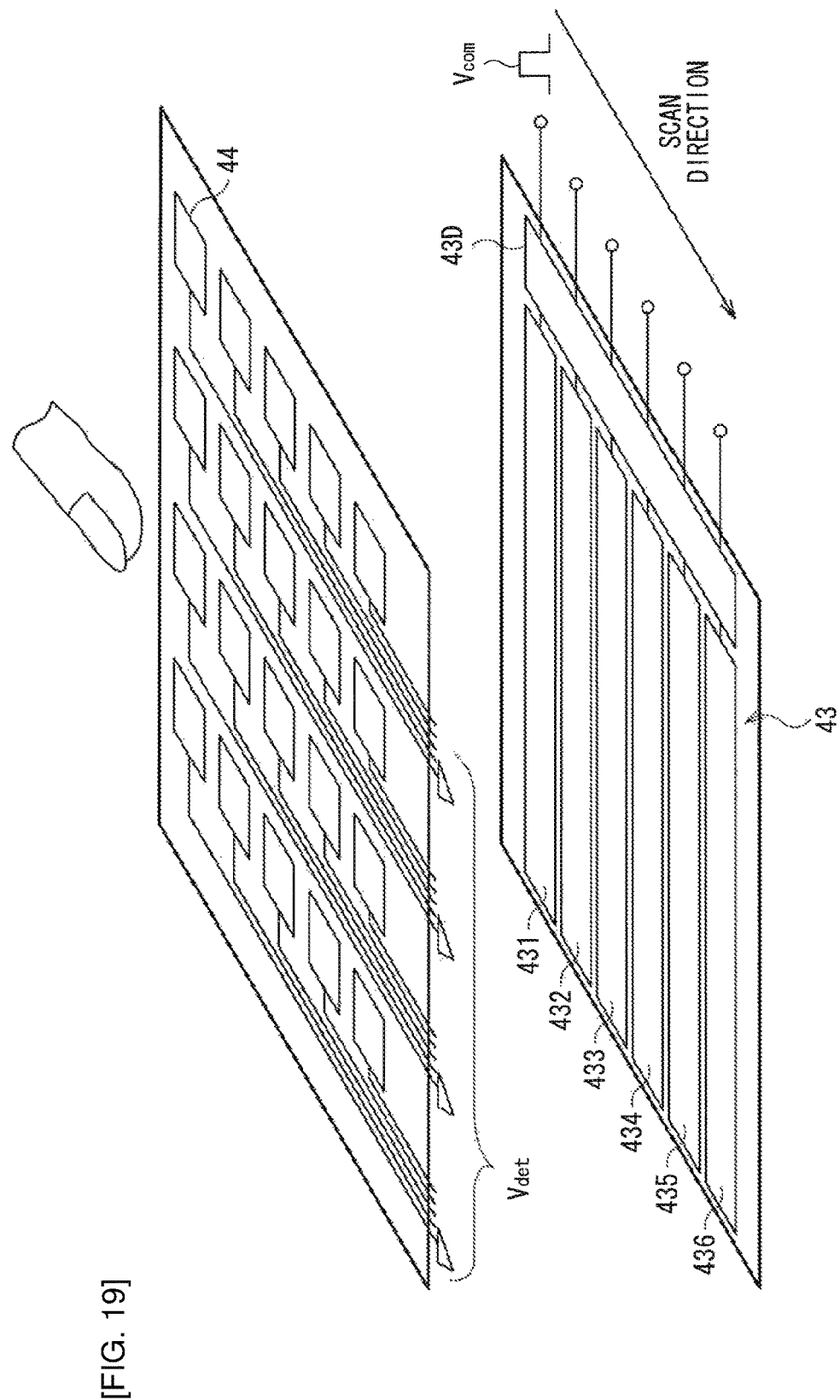
[FIG. 19]

[FIG. 20]
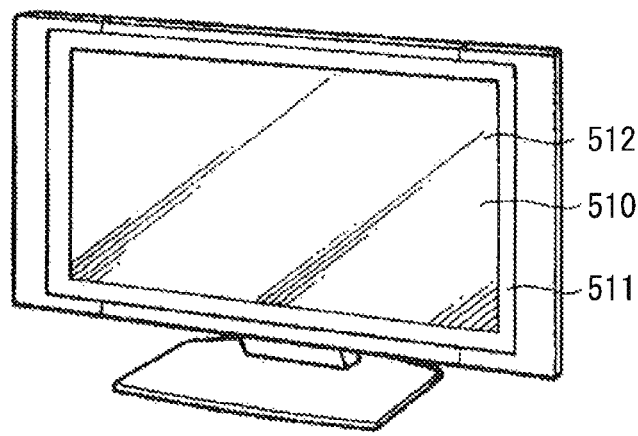
[FIG. 21A]
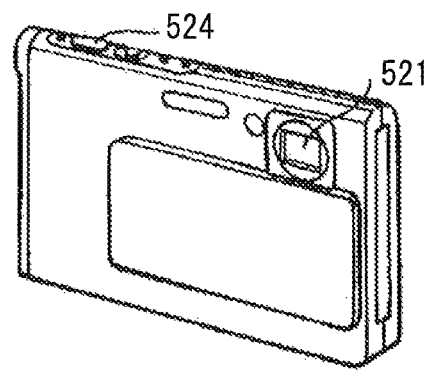
[FIG 21B]
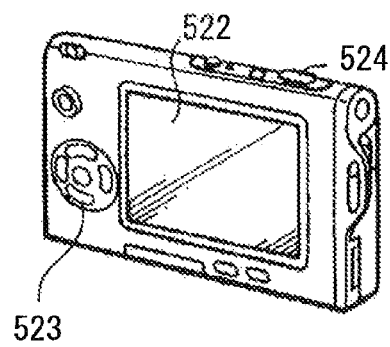

[FIG. 22]
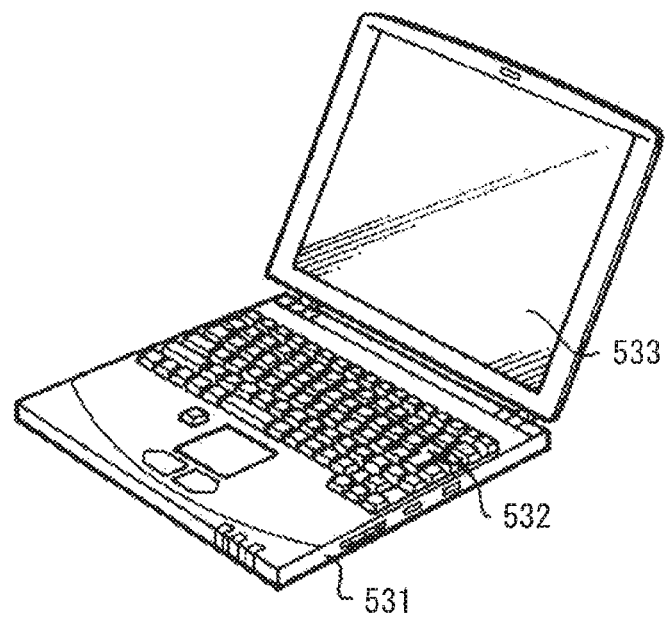
[FIG. 23]
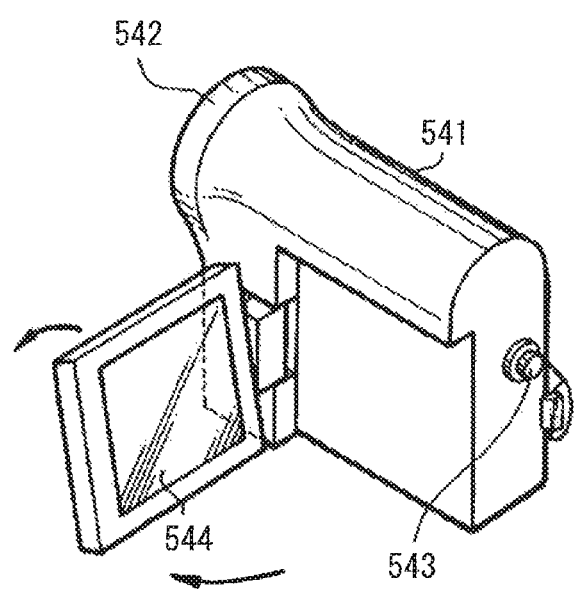

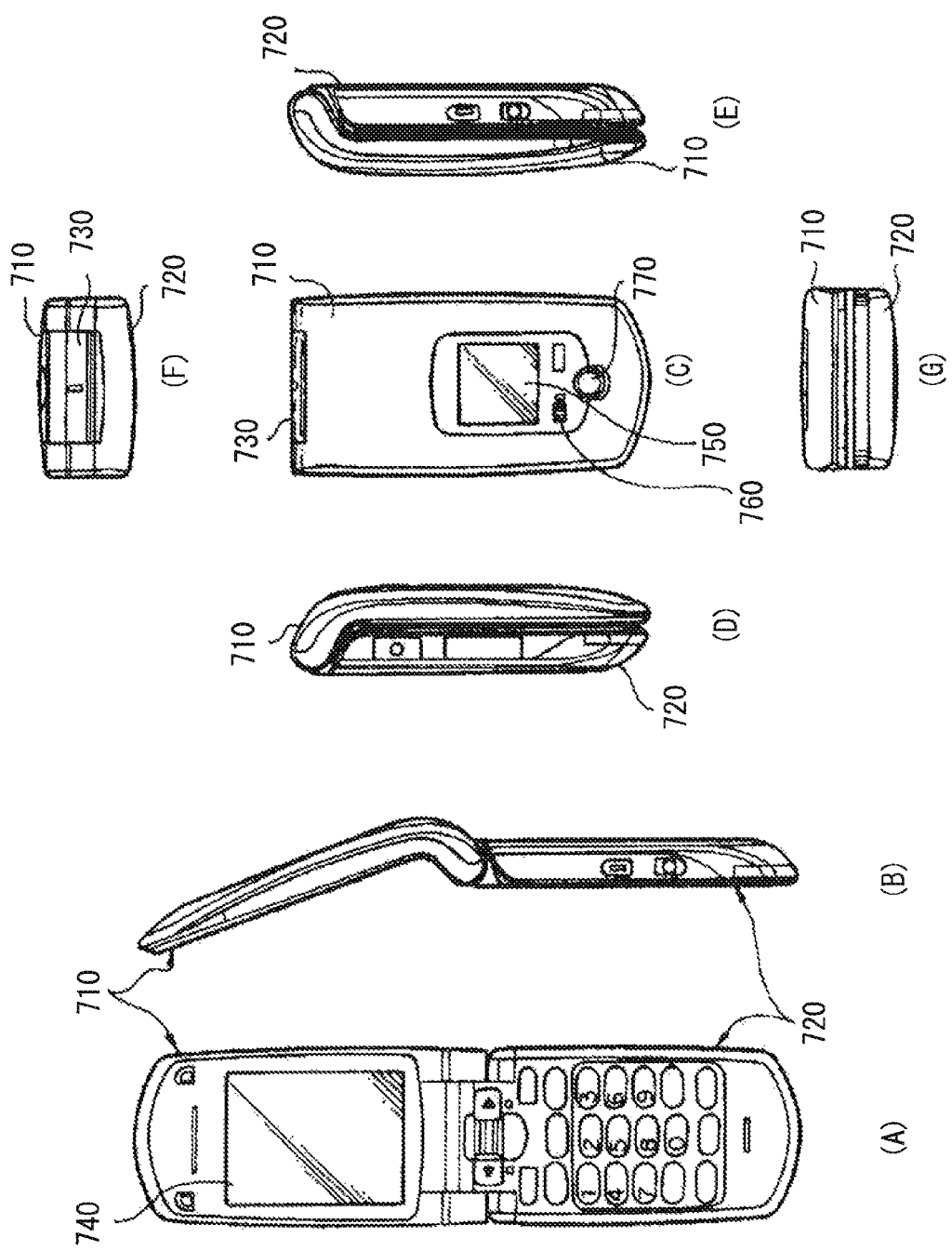
[FIG. 24]

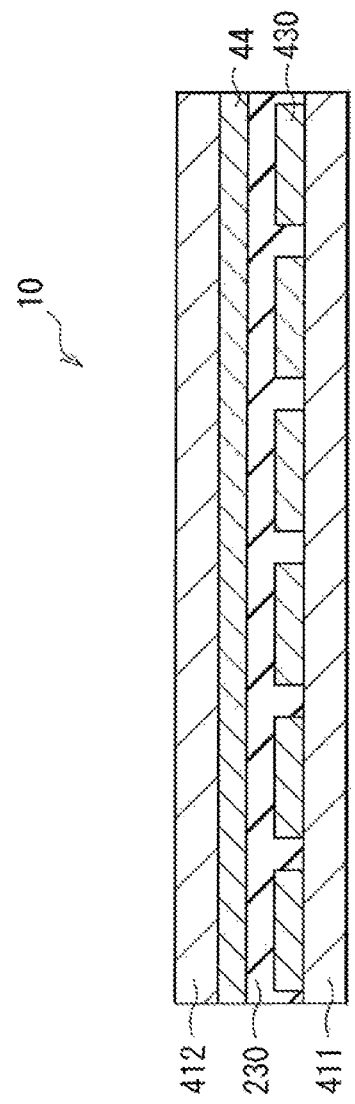
[FIG. 25]

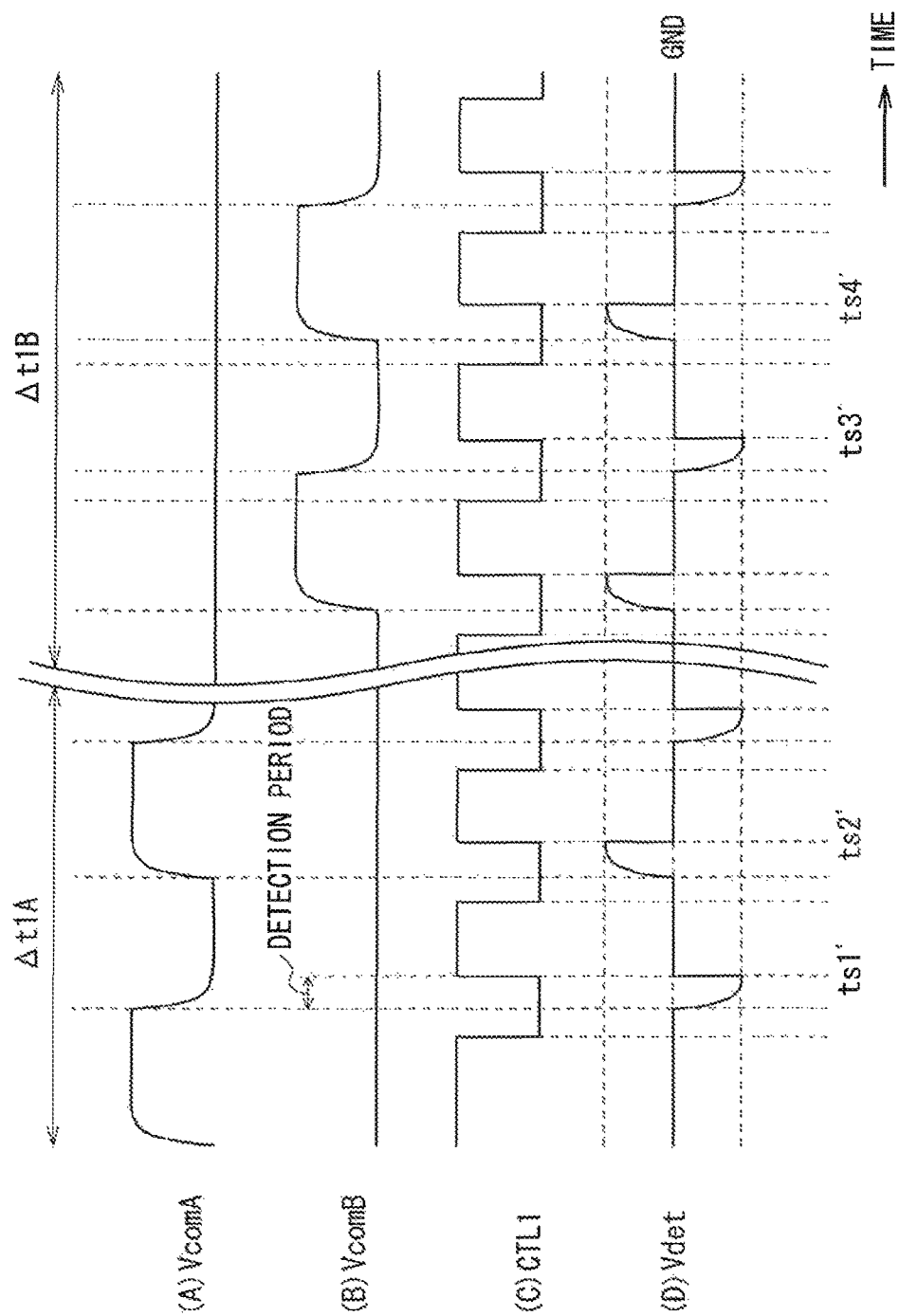
[FIG. 26]

TOUCH SENSOR, DISPLAY AND ELECTRONIC DEVICE

CROSS-REFERENCE TO RELATED APPLICATIONS

The present application is a continuation of U.S. patent application Ser. No. 13/056,315, filed Jan. 28, 2011, which is a U.S. national phase of International Application Serial No. PCT/JP2010/059294, filed May 26, 2010, the entire contents of each of which are hereby incorporated by reference herein.

BACKGROUND

The present disclosure relates to a display such as a liquid crystal display, specifically to a capacitive type touch sensor allowing information to be inputted thereinto by bringing a finger or the like of a user into contact with or close to the touch sensor, and a display and an electronic device including such a touch sensor.

In recent years, attention has been given to a display in which a contact detection device (hereinafter referred to as "touch sensor") or a so-called touch panel is directly mounted on a liquid crystal display and various buttons are displayed on the liquid crystal display so that information is allowed to be inputted by the buttons instead of normal buttons. This technique provides significant advantages of saving space and reducing in the number of components when there is a trend toward larger screen sizes in mobile devices, because a display and buttons are allowed to be located in a common area. However, mounting the touch sensor on the liquid crystal display causes an increase in the whole thickness of a liquid crystal module. In particular, in the case where the touch sensor is applied to a mobile device, a protective layer for preventing scratches on the touch sensor is necessary, so liquid crystal modules have a tendency to have a larger thickness, and this tendency goes against a trend toward thinner liquid crystal modules.

Therefore, for example, in Japanese Unexamined Patent Application Publication No. 2008-9750 (hereinafter "PTL 1"), a liquid crystal display element with a touch sensor in which a capacitive type touch sensor is formed, is proposed so as to reduce the thickness of the liquid crystal display element. In this case, a conductive film for the touch sensor is arranged between an observation-side substrate of the liquid crystal display element and an observation-side polarizing plate arranged on an outer surface of the observation-side substrate, and the capacitive type touch sensor which has an outer surface of the polarizing plate as a touch surface is formed between the conductive film for the touch sensor and the outer surface of the polarizing plate.

However, in the liquid crystal display element with the touch sensor disclosed in the above-described PTL 1, in principle, it is necessary for the conductive film for the touch sensor to have the same potential as that of a user, and it is necessary for the user to be properly grounded. Therefore, aside from stationary televisions drawing power from an outlet, it is realistically difficult to apply the liquid crystal display element with the touch sensor to mobile devices. Moreover, in the above-described technique, it is necessary for the conductive film for the touch sensor to come very close to a finger of the user, so a position where the conductive film for the touch sensor is arranged is limited, for example, the conductive film for the touch sensor is not allowed to be arranged deep in the liquid crystal display element. That is, the degree of flexibility in design is low.

Moreover, in the above-described technique, because of the configuration, it is necessary to arrange a circuit section including a touch sensor drive section or a coordinate detection section separately from a display drive circuit section of the liquid crystal display element, so integration of circuits for a whole apparatus is difficult.

Therefore, in addition to a touch panel directly mounted on a liquid crystal display, for an example, it is considered that a touch detection electrode forming a capacitance between the touch detection electrode and the common electrode is arranged in addition to a common electrode originally arranged for application of a display common voltage. Because the capacitance changes depending on whether or not an object touches or comes close to the touch detection electrode, the display common voltage to be applied to the common electrode by a display control circuit is also used (doubles) as a touch sensor drive signal. Accordingly, a detection signal in response to a change in capacitance is obtained from the touch detection electrode. Then, when the detection signal is inputted into a predetermined touch detection circuit, whether or not the object touches or comes close to the touch detection electrode is detectable. Moreover, by this technique, a display with a touch sensor allowed to be applied to a mobile device of which a user often has an unsteady potential is obtainable. Moreover, a display with a touch sensor having a high degree of flexibility in design according to the type of a display layer is obtainable, and a circuit for display and a circuit for sensor are easily integrated into one circuit substrate, so there is an advantage of easy circuit integration.

Moreover, in various capacitive type touch sensors, to prevent a touch detection electrode for obtaining a detection signal in response to a change in capacitance from being floating, it is considered that the touch detection electrode is grounded through a resistor (e.g., a grounding resistor).

However, in such a configuration, a sensor output is leaked through the grounding resistor (e.g., a leakage current flows from a signal line for the detection signal to the ground). Therefore, it is considered that an appropriate detection signal may not be obtained due to a decrease in the range of a detection signal value or a decrease in a signal value with time.

CITATION LIST

Patent Literature

PTL 1: Patent 2008-9750

SUMMARY

The present patent application disclosure addresses the above-described issues, and it is an object of the disclosure to provide a capacitive type touch sensor which is allowed to appropriately detect an object, and a display and an electronic device including such a touch sensor.

In an example embodiment, a touch sensor apparatus includes a first signal source generating a first drive signal; a first drive electrode receiving the first drive signal from the first signal source; a first detection electrode located adjacent to the first drive electrode; a dielectric material located between the first drive electrode and the first detection electrode defining a first capacitive area, wherein the first detection electrode generates a first output signal driven by the first drive signal; a detection circuit electrically connected to the first detection electrode, the detection circuit sensing the first output signal; and a switch element electrically connected to the first detection electrode, the switch element having a first state and a second state; wherein the switch element forces the first detection electrode to a predefined voltage when the switch element is in the first state, the switch element allows the first detection electrode to float when the switch element is in the second state, and the switch element receives a timing control signal causing the switch element to alternate between the first state and the second state; and wherein the detection circuit determines a first detection result by comparing the first output signal to a signal threshold, the first detection result indicative of whether the first capacitive area was in a touch state.

In an example embodiment, the touch sensor apparatus further includes a second signal source generating a second drive signal; and a second drive electrode receiving the second drive signal from the second signal source; wherein the first detection electrode is located adjacent to the second drive electrode; wherein the dielectric material is located between the second drive electrode and the first detection electrode defining a second capacitive area; wherein the first detection electrode generates a second output signal driven by the second drive signal; wherein the detection circuit senses the second output signal; wherein the switch element forces the second detection electrode to a predefined voltage level when the switch element is in the first state, and the switch element allows the second detection electrode to float when the switch element is in the second state; and wherein the detection circuit determines a second detection result by comparing the second output signal to the signal threshold, the second detection result indicative of whether the second capacitive area was in the touch state.

In an example embodiment, the first drive signal and the second drive signal are sequentially applied to the first drive electrode and the second drive electrode; and the first output signal and the second output signal are sequentially sensed with respect to the first drive signal and the second drive signal being sequentially applied.

In an example embodiment, a second detection electrode located adjacent to the first drive electrode and the second drive electrode; the dielectric material is located between the second detection electrode and the first drive electrode defining a third capacitive area, wherein the second detection electrode generates a third output signal driven by the first drive signal; the dielectric material is located between the second detection electrode and the second drive electrode defining a fourth capacitive area, wherein the second detection electrode generates a fourth output signal driven by the second drive signal; the detection circuit is electrically connected to the second detection electrode, the detection circuit sensing the third output signal and the fourth output signal; the switch element is electrically connected to the second detection electrode, the switch element forces the third detection electrode and the fourth detection electrode to a predefined voltage level when the switch element is in the first state, and the switch element allows the third detection electrode and the fourth detection electrode to float when the switch element is in the second state; the detection circuit determines a third detection result by comparing the third output signal to the signal threshold, the third detection result indicative of whether the third capacitive area was in the touch state; and the detection circuit determines a fourth detection result by comparing the fourth output signal to the signal threshold, the fourth detection result indicative of whether the fourth capacitive area was in the touch state.

In an example embodiment, the first output signal, the second output signal, the third output signal, and the fourth output signal are sequentially sensed from the first detection electrode and the second detection electrode.

In an example embodiment, the switch element includes a first switch for the first detection electrode and a second switch for the second detection electrode.

In an example embodiment, the switch element receives the timing control signal from a timing control circuit, wherein the timing control circuit further transmits timing control signals to the first signal source to control when the first drive signal is on, to the second signal source to control when the second drive signal is on, and to an analog to digital converter section in the detection circuit to control sampling timing.

In an example embodiment, the first detection electrode is part of a display.

In an example embodiment, the first signal source is included in a display control circuit and the first drive electrode is a display common voltage electrode, such that the display control circuit controls a voltage applied between the display common voltage electrode and a pixel electrode so as to display an image based on an image signal, the display common voltage electrode receiving the first drive signal.

In an example embodiment, the detection circuit is formed in a perimeter region on a pixel substrate and integrated with circuit elements for display control.

In an example embodiment, the detection circuit includes at least one of an amplification section, a filter section, a rectification section, a smoothing section, an analog to digital converter section, a signal processing section, and a coordinate extraction section.

In an example embodiment, the predefined voltage level of the switch element is a ground voltage.

In an example embodiment, the touch sensor apparatus further includes a precharge power source electrically connected to the switch element and providing the predefined voltage level, wherein the precharge power source sequentially provides a first predefined voltage level and a second predefined voltage level.

In an example embodiment, the touch sensor apparatus further includes a second detection electrode located adjacent to the first drive electrode and displaced from the first detection electrode in a first direction; a third detection electrode located adjacent to the first drive electrode and displaced from the first detection electrode in a second direction; and a fourth detection electrode located adjacent to the first drive electrode and displaced from the second detection electrode in the second direction and displaced from the third electrode in the first direction; wherein the dielectric material is located between the first drive electrode and the second detection electrode defining a second capacitive area, the dielectric material is located between the first drive electrode and the third detection electrode defining a third capacitive area, and the dielectric material is located between the first drive electrode and the fourth detection electrode defining a fourth capacitive area; wherein the second detection electrode generates a second output signal driven by the first drive signal; wherein the third detection electrode generates a third output signal driven by the first drive signal; wherein the fourth detection electrode generates a fourth output signal driven by the first drive signal; wherein the switch element is electrically connected to the second detection electrode, the third detection electrode, and the fourth detection electrode; wherein the switch element forces the second detection electrode, the third detection electrode, and the fourth detection electrode to a predefined voltage level when the switch element is in the first state, and the switch element allows the second detection electrode, the third detection electrode, and the fourth detection electrode to float when the switch element is in the second state; wherein the detection circuit determines a second detection result by comparing the second output signal to the signal threshold, the second detection result indicative of whether the second capacitive area was in the touch state; wherein the detection circuit determines a third detection result by comparing the third output signal to the signal threshold, the third detection result indicative of whether the third capacitive area was in the touch state; and wherein the detection circuit determines a fourth detection result by comparing the fourth output signal to the signal threshold, the fourth detection result indicative of whether the fourth capacitive area was in the touch state.

In an example embodiment, a display apparatus includes a drive electrode receiving a drive signal; a detection electrode located adjacent to the drive electrode; a dielectric material located between the drive electrode and the detection electrode defining a capacitive area, wherein the detection electrode generates an output signal driven by the drive signal; a detection circuit electrically connected to the detection electrode, the detection circuit sensing the output signal; a switch element electrically connected between the detection electrode and a voltage source providing a predefined voltage level, the switch element having a first state and a second state; and a display control circuit controlling a voltage applied between a display common voltage electrode and a pixel electrode so as to display an image based on an image signal, wherein the display common voltage electrode serves as the drive electrode.

In an example embodiment, a transverse electric mode liquid crystal element is modulated by the voltage applied between the display common voltage electrode and the pixel electrode.

In an example embodiment, the switch element forces the detection electrode to a predefined voltage level when the switch element is in the first state, the switch element allows the detection electrode to float when the switch element is in the second state, and the switch element receives a timing control signal causing the switch element to alternate between the first state and the second state; and the detection circuit determines a detection result by comparing the output signal to a signal threshold, the detection result indicative of whether the capacitive area was in a touch state.

In an example embodiment, the pixel electrode is located between the drive electrode and the detection electrode.

In an example embodiment, the voltage source provides a ground voltage.

In an example embodiment, the voltage source is a precharge power source sequentially providing a first predefined voltage level and a second predefined voltage level.

In an example embodiment, an electronic device includes a capacitive type touch sensor including a capacitive area producing an output signal; a detection circuit sensing the output signal from a detection electrode; and a switch element having a first state and a second state, the switch element forcing the detection electrode to a predefined voltage level when the switch element is in the first state, the switch element allowing the detection electrode to float when the switch element is in the second state, and the switch element alternating between the first state and the second state; wherein the detection circuit determines a detection result by comparing the output signal to a signal threshold, the detection result indicating whether the capacitive area was in a touch state.

In an example embodiment, the capacitive type touch sensor includes a signal source generating a drive signal; a drive electrode receiving the drive signal from the signal source, the detection electrode being located adjacent to the drive electrode; a dielectric material located between the drive electrode and the detection electrode defining a capacitive area, wherein the detection electrode generates the output signal which is driven by the drive signal.

In an example embodiment, the signal source generating the drive signal is one of a plurality of signal sources generating a plurality of drive signals; the drive electrode receiving the drive signal from the signal source is one of a plurality of drive electrodes receiving the plurality of drive signals from the plurality of signal sources; the detection electrode located adjacent to the drive electrode is one of a plurality of detection electrodes located adjacent to the plurality of drive electrodes; the dielectric material located between the drive electrode and the detection electrode defining the capacitive area is further located between the plurality of drive electrodes and the plurality of detection electrodes defining a plurality of capacitive areas; wherein the switch element forces the plurality of detection electrodes to a predefined voltage level when the switch element is in the first state, the switch element allows the plurality of detection electrodes to float when the switch element is in the second state; and the output signal driven by the drive signal is one of a plurality of output signals driven by the plurality of drive signals.

In an example embodiment, the electronic device further includes a timing control section, wherein the switch element receives a timing control signal from the timing control section causing the switch element to alternate between the first state and the second state.

In an example embodiment, the first state of the switch element is closed and the second state of the switch element is open.

In an example embodiment, the first state of the switch element is on and the second state of the switch element is off.

In an example embodiment, the electronic device is at least one of a television, a digital camera, a notebook personal computer, a portable terminal device, a cellular telephone, and a video camera.

In an example embodiment, a touch sensor apparatus includes a capacitive area producing an output signal; a detection circuit sensing the output signal from a detection electrode; and a switch element having a first state and a second state, the switch element forcing the detection electrode to a predefined voltage level when the switch element is in the first state, the switch element allowing the detection electrode to float when the switch element is in the second state, and the switch element alternating between the first state and the second state; wherein the detection circuit determines a detection result indicative of whether the capacitive area was in a touch state.

In an example embodiment, the touch state is caused by an object touching the detection electrode.

In an example embodiment, the touch state is caused by an object coming close to touching the detection electrode.

In an example embodiment, a change in capacitance of the capacitive area causes the detection result to indicate that the capacitive area was in the touch state.

In an example embodiment, a change in capacitance of the capacitive area causes the detection result to indicate that the capacitive area was in the touch state and the change in capacitance is caused by a finger touching the capacitive area by at least one of touching a detection electrode and coming close to touching the detection electrode.

In an example embodiment, the detection result indicates that the capacitive area was in a non-touch state.

In an example embodiment, the switch element receives a timing control signal causing the switch element to alternate between the first state and the second state and controlling the duration of switching between the first state and the second state.

In an example embodiment, the timing control signal causes the switch element to be in the first state for a shorter period of time than the timing control signal causes the switch element to be in the second state.

In an example embodiment, the predefined voltage level is a ground voltage.

In an example embodiment, the touch sensor apparatus further includes a signal source generating a drive signal; and a drive electrode receiving the drive signal from the signal source, the detection electrode being located adjacent to the drive electrode; wherein the polarity of the drive signal is periodically reversed at predetermined intervals, and the switch element changes from the first state to the second state before a polarity-reversing timing of the drive signal in synchronization with the predetermined intervals.

In an example embodiment, the detection circuit determines the detection result by comparing the output signal to a signal threshold during the second state at a sampling timing which is set based upon a saturation time after the polarity-reversing timing.

In an example embodiment, the external proximity object is detected based on the detection signal obtained from the touch detection electrode in response to a change in capacitance, and in the touch detection circuit, the switch element is arranged between the detection signal line and the fixed potential section (e.g., a ground), so while the detection signal line is prevented from being floating to cause fluctuations in the detection signal value, the generation of a leakage current is reduced, thereby a decrease in the range of the detection signal value or a decrease in the detection signal value with time is allowed to be reduced. Therefore, appropriate object detection is performed by the capacitive type touch sensor, and detection sensitivity is allowed to be improved.

In another example embodiment, a display includes: a plurality of display pixel electrodes; common electrodes arranged to face the display pixel electrodes; a display layer; a display control circuit performing image display control based on an image signal so as to activate the display layer by applying a voltage for display between the display pixel electrodes and the common electrodes; a touch detection electrode facing the common electrode or arranged side by side with the common electrode to form a capacitance between the touch detection electrode and the common electrode; and a touch detection circuit detecting an external proximity object based on a detection signal obtained from the touch detection electrode with use of a display common voltage applied to the common electrode by the display control circuit as a touch sensor drive signal, wherein the touch detection circuit includes a switch element between a detection signal line connected to the touch detection electrode and a fixed potential section having a predetermined fixed potential.

In another example embodiment, the switch element performs a precharge to the detection signal line by turning on.

In another example embodiment, the polarity of the display common voltage as the touch sensor drive signal is periodically reversed at predetermined intervals, and the switch element performs the precharge to the detection signal line by turning on before a polarity-reversing timing of the touch sensor drive signal in synchronization with the predetermined intervals.

In another example embodiment, the display further includes a precharge power source provided between the switch element and the fixed potential section to alternately output two different precharge voltages in a time-divisional manner in synchronization with a polarity-reversing period of the touch sensor drive signal.

In another example embodiment, the touch detection circuit reads out the detection signal at a saturation timing at which the value of the detection signal is saturated, and detects the external proximity object based on the detection signal read out at the saturation timing.

In another example embodiment, the display includes: a circuit substrate in which the display control circuit is formed; and an opposed substrate arranged to face the circuit substrate, wherein the display pixel electrodes are arranged on a side facing the opposed substrate of the circuit substrate, the common electrodes are arranged on a side facing the circuit substrate of the opposed substrate, and the display layer is sandwiched between the display pixel electrodes of the circuit substrate and the common electrodes of the opposed substrate.

In another example embodiment, the display includes: a circuit substrate in which the display control circuit is formed; and an opposed substrate arranged to face the circuit substrate, wherein the common electrodes and the display pixel electrodes are laminated in order on the circuit substrate with an insulating layer in between, and the display layer is sandwiched between the display pixel electrodes of the circuit substrate and the opposed substrate.

In another example embodiment, a touch sensor includes: a touch drive electrode; a touch detection electrode facing the touch drive electrode or arranged side by side with the touch drive electrode to form a capacitance between the touch detection electrode and the touch drive electrode; and a touch detection circuit detecting an external proximity object based on a detection signal obtained from the touch detection electrode by applying a touch sensor drive signal to the touch drive electrode, wherein the touch detection circuit includes a switch element between a detection signal line connected to the touch detection electrode and a fixed potential section having a predetermined fixed potential.

In another example embodiment, an electronic device including a display with a touch sensor includes: a plurality of display pixel electrodes; common electrodes arranged to face the display pixel electrodes; a display layer; a display control circuit performing image display control based on an image signal so as to activate the display layer by applying a voltage for display between the display pixel electrodes and the common electrodes; a touch detection electrode facing the common electrode or arranged side by side with the common electrode to form a capacitance between the touch detection electrode and the common electrode; and a touch detection circuit detecting an external proximity object based on a detection signal obtained from the touch detection electrode with use of a display common voltage applied to the common electrode by the display control circuit as a touch sensor drive signal, wherein the touch detection circuit includes a switch element between a detection signal line connected to the touch detection electrode and a fixed potential section having a predetermined fixed potential.

Additional features and advantages are described herein, and will be apparent from the following Detailed Description and the figures.

BRIEF DESCRIPTION OF DRAWINGS

FIG. 1 is an example illustration for describing an operation principle of a display with a touch sensor according to the disclosure which is not touched by a finger.

FIG. 2 is an example illustration for describing the operation principle of the display with the touch sensor according to the disclosure which is touched by a finger.

FIG. 3 is an example illustration for describing the operation principle of the display with the touch sensor according to the disclosure, and illustrates an example of waveforms of a touch sensor drive signal and a detection signal.

FIG. 4 is a schematic sectional view illustrating a display with a touch sensor according to a first example embodiment.

FIG. 5 is a perspective view illustrating a configuration example of a main part (a common electrode and a sensor detection electrode) of the display illustrated in FIG. 4.

FIG. 6 is a circuit diagram illustrating a configuration example of a detection circuit and the like in the display illustrated in FIG. 4.

FIG. 7 is an illustration of a schematic configuration of a display with a touch sensor according to a comparative example and an example of a timing waveform of a detection signal.

FIG. 8 is a timing waveform chart for describing a detection operation of the display illustrated in FIG. 7.

FIG. 9 is an illustration of a schematic configuration of the display according to the first example embodiment and an example of a timing waveform of a detection signal.

FIG. 10 is a timing waveform chart for describing a detection operation of the display according to the first example embodiment.

FIG. 11 is a schematic view illustrating a display with a touch sensor according to a second example embodiment.

FIG. 12 is a timing waveform chart for describing a detection operation of the display according to the second example embodiment.

FIG. 13 is a schematic sectional view illustrating a display with a touch sensor according to a third example embodiment.

FIG. 14 is an enlarged perspective view of a main part of the display illustrated in FIG. 13.

FIG. 15 is a sectional view for describing an operation of the display illustrated in FIG. 13.

FIG. 16 is a schematic sectional view illustrating a display with a touch sensor according to a modification example of the third example embodiment.

FIG. 17 is a schematic sectional view illustrating a display with a touch sensor according to another modification example of the third example embodiment.

FIG. 18 is a perspective view illustrating a configuration of a main part (a common electrode and a sensor detection electrode) of a display with a touch sensor according to Modification Example 1 of the disclosure.

FIG. 19 is a perspective view illustrating a configuration of a main part (a common electrode and a sensor detection electrode) of a display with a touch sensor according to Modification Example 2 of the disclosure.

FIG. 20 is an external perspective view of Application Example 1 of the display according to the above-described respective embodiments and the like.

FIGS. 21A and 21 B are external perspective views from the front side and the back side of Application Example 2, respectively.

FIG. 22 is an external perspective view of Application Example 3.

FIG. 23 is an external perspective view of Application Example 4.

FIG. 24 illustrates Application Example 5, (A) and (B) are a front view and a side view in a state in which Application Example 5 is opened, respectively, and (C), (D), (E), (F) and (G) are a front view, a left side view, a right side view, a top view and a bottom view in a state in which Application Example 5 is closed, respectively.

FIG. 25 is a sectional view illustrating a configuration of a main part of a touch sensor according to another modification example.

FIG. 26 is a timing waveform chart for describing a detection operation of a display according to a modification example of the first embodiment.

DETAILED DESCRIPTION

Exemplary embodiments will be described in detail below referring to the accompanying drawings. The description is given in the following order:

1. First Example Embodiment (Example in which a switch element is arranged between a sensor detection electrode and a ground)
2. Second Example Embodiment (Example in which a precharge power source is arranged between a switch element and a ground)
3. Third Example Embodiment (Example in which a transverse electric mode liquid crystal element is used as a display element)
4. Modification Examples (Modification Examples 1 and 2: Other configuration examples of a common electrode and a sensor detection electrode)
5. Application Examples (Application examples of a display with a touch sensor to electronic devices)

First, referring to FIGS. 1 to 3, an example embodiment of a touch detection system in a display with a touch sensor of the present disclosure will be described below. The touch detection system is embodied as a capacitive type touch sensor, and, for example, as illustrated in FIG. 1(A), the touch detection system has a configuration in which a capacitive element is configured using a pair of electrodes (e.g., a drive electrode E1 and a detection electrode E2) arranged to face each other with a dielectric D in between. This configuration is illustrated as an equivalent circuit illustrated in FIG. 1(B). A capacitive element C1 is configured of the drive electrode E1, the detection electrode E2 and the dielectric D. In the capacitive element C1, one end thereof is connected to an AC signal source (e.g., a drive signal source) S, and the other end P thereof is grounded through a switch element SW1 which will be described later and is connected to a voltage detector (e.g., a detection circuit) DET. When an AC rectangular wave Sg (refer to FIG. 3(B)) with a predetermined frequency (for example, approximately a few kHz to ten-odd KHz) is applied from the AC signal source S to the drive electrode E1 (e.g., the one end of the capacitive element C1), an output waveform (e.g., a detection signal Vdet) as illustrated in FIG. 3(A) appears in the detection electrode E2 (e.g., the other end P of the capacitive element C1). In addition, the AC rectangular wave Sg corresponds to a common drive signal Vcom which will be described later.

In a state where a finger does not touch (e.g., comes close to) the detection electrode E2, as illustrated in FIG. 1, a current I0 according to the capacity value of the capacitive element C1 flows during charging and discharging the capacitive element C1. A potential waveform at the other end P of the capacitive element C1 at this time is, for example, as illustrated by a waveform V0 in FIG. 3(A), and the waveform V0 is detected by the voltage detector DET.

On the other hand, in a state where the finger touches (or comes close to) the detection electrode E2, as illustrated in FIG. 2, a capacitive element C2 formed by the finger is added to the capacitive element C1 in series. In this state, currents I1 and I2 flow during charging and discharging the capacitive elements C1 and C2, respectively. The potential waveform at the other end P of the capacitive element C1 at this time is, for example, as illustrated by a waveform V1 in FIG. 3(A), and the waveform V1 is detected by the voltage detector DET. At this time, the potential at a point P is a divided potential determined by the values of the current I1 and I2 flowing through the capacitive elements C1 and C2, respectively. Therefore, the waveform V1 has a smaller value than that of the waveform V0 in a non-touch state. As will be described later, the voltage detector DET compares a detected voltage with a predetermined threshold voltage Vth, and when the detected voltage is equal to or higher than the threshold voltage Vth, the voltage detector DET determines that the state is in a non-touch state, and when the detected voltage is smaller than the threshold voltage, the voltage detector DET determines that the state is a touch state. Thus, touch detection is allowed.

<1. First Example Embodiment>

FIG. 4 illustrates a sectional configuration of a main part of a display 1 with a touch sensor according to a first example embodiment of the disclosure. The display 1 uses a liquid crystal display element as a display element and configures a capacitive type touch sensor by commonly using some (e.g., a common electrode 43 which will be described later) of electrodes and a display drive signal (e.g., a common drive signal Vcom) which are originally included in the liquid crystal display element.

As illustrated in FIG. 4, the display 1 includes a pixel substrate 2, an opposed substrate 4 arranged to face the pixel substrate 2, and a liquid crystal layer 6 arranged between the pixel substrate 2 and the opposed substrate 4.

The pixel substrate 2 includes a TFT substrate 21 as a circuit substrate and a plurality of pixel electrodes arranged in a matrix form on the TFT substrate 21. In the TFT substrate 21, in addition to a display driver and a TFT (thin film transistor) (both not illustrated) for driving each of the pixel electrodes 22, wires such as a source line for supplying a pixel signal to each of the pixel electrodes 22 and a gate line for driving each TFT are formed. A detection circuit (refer to FIG. 6) performing a touch detection operation which will be described later may be also formed in the TFT substrate 21.

The opposed substrate 4 includes a glass substrate 41, a color filter formed on one surface of the glass substrate 41 and the common electrode 43 formed on the color filter 42. The color filter 42 is configured of, for example, color filter layers of three colors including red (R), green (G) and blue (B) which are periodically arranged, and a combination of the three colors R, G and B is allocated to each display pixel (e.g., each of the pixel electrodes 22). The common electrode 43 doubles as a sensor drive electrode configuring a part of the touch sensor performing a touch detection operation, and corresponds to the drive electrode E1 in FIG. 1.

The common electrode 43 is connected to the TFT substrate 21 through a contact conductive pillar 7. The common drive signal Vcom with an AC rectangular waveform is applied from the TFT substrate 21 to the common electrode 32 through the contact conductive pillar 7. The common drive signal Vcom sets a display voltage of each pixel with a pixel voltage applied to the pixel electrodes 22, and the common drive signal Vcom doubles as a touch sensor drive signal, and corresponds to an AC rectangular wave Sg supplied from the drive signal source S in FIG. 1. In other words, the polarity of the common drive signal Vcom is reversed at predetermined intervals.

A sensor detection electrode (e.g., a touch detection electrode) 44 is formed on the other surface of the glass substrate 41, and a polarizing plate 45 is arranged on the sensor detection electrode 44. The sensor detection electrode 44 configures a part of the touch sensor, and corresponds to the detection electrode E2 in FIG. 1.

The liquid crystal layer 6 modulates light passing therethrough according to an electric field state, and uses, for example, a liquid crystal of any one of various modes such as TN (Twisted Nematic), VA (Vertical Alignment) and ECB (Electrically Controlled Birefringence).

In addition, alignment films are arranged between the liquid crystal layer 6 and the pixel substrates 2 and between the liquid crystal layer 6 and the opposed substrate 4, respectively, and an incident-side polarizing plate (not illustrated herein) is arranged on a lower surface of the pixel substrate 2.

FIG. 5 illustrates a perspective view of a configuration example of the common electrode 43 and the sensor detection electrode 44 in the opposed substrate 4. In the example, the common electrode 43 is divided into a plurality of stripe-shaped electrode patterns extending in a lateral direction in the drawing (e.g., 6 common electrodes 431 to 436 which may include a first, second, third, fourth, fifth, and sixth drive electrode). The common drive signal Vcom is sequentially supplied to the electrode patterns by a driver 43D so as to perform a line-sequential scanning drive in a time-divisional manner. On the other hand, the sensor detection electrode 44 (e.g., a first, second, third, and fourth detection electrode, etc.) is configured of a plurality of stripe-shaped electrode patterns extending in a direction orthogonal to a direction where the electrode patterns of the common electrode 43 extend. The detection signal Vdet is outputted from each of the electrode patterns of the sensor detection electrode 44 to be inputted into a detection circuit 8 illustrated in FIG. 6.

FIG. 6 illustrates a circuit configuration example of the drive signal source S illustrated in FIG. 1 and the detection circuit 8 performing a touch detection operation together with a timing control section 9 as a timing generator. In the drawing, capacitive elements C11 to C16 correspond to (electrostatic) capacitive elements formed between the common electrodes 431 to 436 and the sensor detection electrode 44 illustrated in FIG. 5, respectively (e.g., a first, second, third, fourth, fifth, and sixth capacitive area).

One drive signal source S is arranged for each of the capacitive elements C11 to C16. The drive signal source S includes an SW control section 11, two switch elements 12 and 15, two inverter (logical NOT) circuits 131 and 132 and an operational amplifier 14. The SW control section 11 controls ON/OFF states of the switch element 12, and thereby a connection state between a power source +V and the inverter circuits 131 and 132 is controlled. An input terminal of the inverter circuit 131 is connected to one end (e.g., a terminal on a side opposite to a side facing the power source +V) of the switch element 12 and an output terminal of the inverter circuit 132. An output terminal of the inverter circuit 131 is connected to an input terminal of the inverter circuit 132 and an input terminal of the operational amplifier 14. Thereby, these inverter circuits 131 and 132 function as oscillation circuits outputting a predetermined pulse signal. The operational amplifier 14 is connected to two power sources +V and −V. The ON/OFF states of the switch element 15 are controlled in response to a timing control signal supplied from the timing control section 9. More specifically, by the switch element 15, one end (e.g., on a side facing the common electrodes 431 to 436) of each of the capacitive elements C11 to C16 is connected to an output terminal (e.g., on a side facing a supply source of the common drive signal Vcom) of the operational amplifier 14 or a ground. Thereby, the common drive signal Vcom is supplied from each of drive signal sources S to each of the capacitive elements C11 to C16. It is also included as one of the embodiment to connect a drive signal source to the capacitive elements C11 to C16 with switch means controlled by the timing control section 9 instead of providing each drive signal source for each of the capacitive elements C11 to C16.

The detection circuit 8 (e.g., the voltage detector DET) includes an amplification section 81, a rectification-smoothing section 82, an A/D (analog/digital) converter section 83, a signal processing section 84, a coordinate extraction section 85 and a switch element SW1. In addition, an input terminal Tin of the detection circuit 8 is commonly connected to the other end (e.g., on a side facing the sensor detection electrode 44) of each of the capacitive elements C11 to C16.

The amplification section 81 is a section amplifying the detection signal Vdet inputted from the input terminal Tin, and includes an operational amplifier 811 for signal amplification, two resistors 812R and 813R and two capacitor 812C and 813C. A positive input end (+) of the operational amplifier 811 is connected to the input terminal Tin, and an output end of the operational amplifier 811 is connected to an anode of a diode 82D in the rectification-smoothing section 82 which will be described later. One end of the resistor 812R and one end of the capacitor 812C are connected to the output end of the operational amplifier 811, and the other end of the resistor 812R and the other end of capacitor 812C are connected to a negative input end (−) of the operational amplifier 811. Moreover, one end of the resistor 813R is connected to the other end of the resistor 812R and the other end of the capacitor 812C, and the other end of the resistor 813R is connected to a ground through the capacitor 813R. Thereby, the resistor 812R and the capacitor 812C function as a low-pass filter (LPF) cutting off a high frequency and allowing a low frequency to pass therethrough, and the resistor 813R and the capacitor 813C function as a high-pass filter (HPF) allowing a high frequency to pass therethrough.

The switch element SW1 is arranged between a connection point P on the positive input end (+) side of the operational amplifier 811 and a ground. As will be described in detail later, the ON/OFF states of the switch element SW1 are controlled by a timing control signal CTL1 supplied from the timing control section 9.

The rectification-smoothing section 82 rectifies and smoothes a detection signal outputted from the amplification section 81, and includes a rectification section configured of a diode 82D for half-wave rectification and a smoothing section configured of a resistor 82R and a capacitor 82C which each have one end connected to a ground and are connected in parallel. The anode of the diode 82D is connected to the output end of the operational amplifier 811, and a cathode of the diode 82D is connected to one end of the resistor 82R, one end of the capacitor 82C and an input end of the A/D converter section 83.

The A/D converter section 83 is a section converting an analog detection signal rectified and smoothed by the rectification-smoothing section 82 into a digital detection signal, and includes a comparator (not illustrated). The comparator compares the potential of the inputted detection signal with the potential of the predetermined threshold voltage Vth (refer to FIG. 3). In addition, a sampling timing in A/D conversion by the A/D converter section 83 is controlled by a timing control signal CTL2 supplied from the timing control section 9.

The signal processing section 84 performs a predetermined signal process (for example, a signal process such as a process of digitally removing noise or a process of converting frequency information into position information) on the digital detection signal outputted from the A/D converter section 83.

The coordinate extraction section 85 determines a detection result (e.g., whether or not the sensor detection electrode 44 is touched, and in the case where the sensor detection electrode 44 is touched, position coordinates of a touched position) based on the detection signal outputted from the signal processing section 84, and outputs the detection result from an output terminal Tout.

In addition, such a detection circuit 8 may be formed in a perimeter region (e.g., a non-display region or a frame region) on the opposed substrate 4, or a perimeter region on the pixel substrate 2. However, in terms of simplification by circuit integration, the detection circuit 8 is more preferably formed on the pixel substrate 2, because the detection circuit 8 is integrated with various circuit elements for display control which are formed on the pixel substrate 2. In this case, each electrode pattern of the sensor detection electrode 44 and the detection circuit 8 of the pixel substrate 2 may be connected to each other through a contact conductive pillar (not illustrated) similar to the contact conductive pillar 7 so as to transmit the detection signal Vdet from the sensor detection electrode 44 to the detection circuit 8.

Next, functions and effects of the display 1 according to the example embodiment will be described below.

In the display 1, a display driver (not illustrated) of the pixel substrate 2 line-sequentially supplies the common drive signal Vcom to the electrode patterns (e.g., the common electrodes 431 to 436) of the common electrode 43. The display driver also supplies a pixel signal to the pixel electrodes 22 through the source line, and line-sequentially controls switching of TFTs of pixel electrodes 22 through the gate line in synchronization with the supply of the pixel signal. Thereby, an electric field in a longitudinal direction (e.g., a direction perpendicular to a substrate) determined by the common drive signal Vcom and each pixel signal is applied to the liquid crystal layer 6 in each pixel to modulate a liquid crystal state. Thus, display by a so-called reverse drive is performed.

On the other hand, in the opposed substrate 4, the capacitive elements C1 (e.g., the capacitive elements C11 to C16) are formed at intersections of the electrode patterns of the common electrode 43 and the electrode patterns of the sensor detection electrode 44, respectively. When the common drive signal Vcom is sequentially applied to the electrode patterns (e.g., the common electrodes 431 to 436) of the common electrode 43 in a time-divisional manner, the capacitive elements C11 to C16 in one line formed at intersections of the electrode patterns to which the common drive signal Vcom is applied of the common electrode 43 and the electrode patterns of the sensor detection electrode 44 are charged and discharged. As a result, the detection signal Vdet with a magnitude according to the capacity value of the capacitive element C1 is outputted from each of the electrode patterns of the sensor detection electrode 44. In a state where a finger of a user does not touch a surface of the opposed substrate 4, the magnitude of the detection signal Vdet is substantially constant. The line of the capacitive elements C1 subjected to charge and discharge is line-sequentially moved according to scanning by the common drive signal Vcom.

In addition, in the case where the electrode patterns of the common electrode 43 are line-sequentially driven in such a manner, a line-sequential drive operation is preferably performed collectively on some of the electrode patterns of the common electrode 43. More specifically, a drive line L configured of some of the electrode patterns includes a detection drive line L1 configured of a plurality of electrode patterns and a display drive line L2 configured of one or more electrode patterns. Thereby, degradation in image quality due to scratches or speckles corresponding to the shapes of the electrode patterns of the common electrode 43 is preventable.

In this case, when the finger of the user touches a position of the surface of the opposed substrate 4, the capacitive element C2 by the finger is added to the capacitive element C1 which is originally formed in the touched position. As a result, the value of the detection signal Vdet when the touched position is scanned (that is, when the common drive signal Vcom is applied to an electrode pattern corresponding to the touched position in the electrode patterns of the common electrode 43) is smaller than that when other positions are scanned. The detection circuit 8 (refer to FIG. 6) compares the detection signal Vdet with the threshold voltage Vth, and in the case where the detection signal Vdet is smaller than the threshold voltage Vth, the detection circuit 8 determines the position as the touched position. The touched position is allowed to be determined based on a timing of applying the common drive signal Vcom and a timing of detecting the detection signal Vdet which is smaller than the threshold voltage Vth.

Thus, in the display 1 with the touch sensor according to the example embodiment, the common electrode 43 originally included in the liquid crystal display element doubles as one of a pair of touch sensor electrodes configured of a drive electrode and a detection electrode. Moreover, the common drive signal Vcom as a display drive signal doubles as a touch sensor drive signal. Thereby, in the capacitive type touch sensor, only the sensor detection electrode 44 is additionally arranged, and it is not necessary to additionally prepare a touch sensor drive signal. Therefore, the configuration of the display 1 with the touch sensor is simple.

Moreover, in a display with a touch sensor in related art (refer to PTL 1), the magnitude of a current flowing through the sensor is accurately measured, and a touched position is determined based on the measured value by analog computing. On the other hand, in the display 1 according to the example embodiment, it is only necessary to digitally detect the presence or absence of a relative change in current (e.g., a potential change) depending on whether or not the sensor detection electrode is touched, so detection accuracy is allowed to be improved with a simple detection circuit configuration. Moreover, a capacitance is formed between the common electrode 43 originally arranged for application of the common drive signal Vcom and the sensor detection electrode 44 additionally arranged, and touch detection is performed using a change in the capacitance with the touch of the finger of the user. Therefore, the display 1 is applicable to a mobile device of which a user often has an unsteady potential.

Moreover, the sensor detection electrode 44 is divided into a plurality of electrode patterns, and the electrode patterns are individually driven in a time-divisional manner, so a touched position is detectable.

Next, referring to FIGS. 7 to 10, one part of the disclosure will be described in detail in comparison with a comparative example.

First, referring to FIGS. 7 and 8, a display 101 with a touch sensor according to a comparative example will be described below. As illustrated in FIG. 7(A), in the display 101 according to the comparative example, to prevent a sensor detection electrode 104 from being floating and to keep a stable state, a resistor R101 (e.g., a grounding resistor) is arranged between the touch detection electrode 104 and a ground. Thereby, in a detection circuit 108, the signal value of the detection signal Vdet is prevented from being unstable and fluctuating. Moreover, there is an advantage that static electricity is allowed to be discharged to the ground through the resistor R101. In addition, in FIG. 7(A), for convenience in description, some of peripheral circuits around an operational amplifier 108A (e.g., corresponding to the operational amplifier 811 in FIG. 6) are not illustrated, and the same holds true in FIGS. 9(A) and 11 which will be described later.

However, in such a configuration, as illustrated in FIG. 7(A), a sensor output is leaked through the resistor R101 (e.g., a leakage current IL flows from a signal line for the detection signal Vdet to the ground). Therefore, the range of the signal value of the detection signal Vdet may be reduced due to such a leakage current IL. Moreover, as indicated by detection signal waveforms G101A and G101B in FIG. 7(B) and arrows in FIG. 8(C), the signal value of the detection signal Vdet is reduced with time, so the signal value is different depending on a sampling timing (e.g., a readout timing) in the A/D converter section 83. Therefore, in the display 01 according to the comparative example, an appropriate detection signal Vdet may not be obtained due to the leakage current IL.

Moreover, in the display 101 according to the comparative example, the signal value of the detection signal Vdet exceeds a dynamic range of a readout circuit (e.g., the A/D converter section 83) due to disturbance noise or the like, thereby the detection signal Vdet may not be read out.

Further, the touch detection electrode 104 and the signal line for the detection signal Vdet are intended to use a high-resistance transparent electrode such as ITO (Indium Tin Oxide), so a parasitic capacity is also increased. Therefore, due to a difference in time constant depending on a touched position on the display 101, the gradient of a signal waveform in the detection signal Vdet differs depending on the touched position, thereby position dependence on the touched position may be established. More specifically, for example, in a common electrode 103 in FIG. 7(A), position dependence is established in the detection signal Vdet obtained from a common electrode 103A corresponding to a position P101A far from the detection circuit 108 and the detection signal Vdet obtained from a common electrode 103B corresponding to a position P101B near the detection circuit 108. In other words, as in the case of the detection signal waveforms G101A (corresponding to the detection signal Vdet from the common electrode P103A) and G101B (corresponding to the detection signal Vdet from the common electrode P103B) illustrated in FIG. 7(B), the gradients of the waveforms at a rising edge and a trailing edge differ, so peak positions of the waveforms differ. More specifically, while in the detection signal waveform G101A, a peak value V101A is obtained at a timing t101A, in the detection signal waveform G101B, a peak value V101B (>V101A) is obtained at a timing t101B (<t101A). In addition, in FIG. 7(B), arrows illustrated in the detection signal waveforms G101A and G101B indicate changes in waveform depending on whether a finger or not touches the touch detection electrode 104. Moreover, in FIG. 8, (A) illustrates a common drive signal VcomA applied to the common electrode P103A and (B) illustrates a common drive signal VcomB applied to the common electrode P103B, and periods Δt101A and Δt101B indicate periods in which the common drive signals VcomA and VcomB are applied, respectively.

On the other hand, in the display 1 according to the example embodiment illustrated in FIGS. 1, 2, 6 and 9(A), in the detection circuit 8, the switch element SW1 is arranged between the signal line for the detection signal Vdet and the ground. Therefore, when the switch element SW1 turns on at a predetermined timing in response to a timing control signal CTL from the timing control section 9, the signal line for the detection signal Vdet is prevented from being floating to cause fluctuations in a detection signal value.

More specifically, the timing control section 9 controls the switch element SW1 to turn on in synchronization with a timing immediately before a polarity-reversing timing of the common drive signal Vcom (for example, timings t1 to t4 in FIG. 10). Thereby, the signal line for the detection signal Vdet has a ground voltage (a precharge voltage), so, for example, as indicated by precharge timings tp1 to tp3 in FIG. 10, a precharge is performed to the signal line for the detection signal Vdet. Then, such a precharge is regularly performed to initialize (or reset) the potential of the signal line for the detection signal Vdet to a fixed potential, thereby unlike the above-described comparative example, the signal value of the detection signal Vdet is prevented from exceeding the dynamic range of the readout circuit or the like due to disturbance noise or the like.

Moreover, when the switch element SW turns off, a leakage path is eliminated, so unlike the above-described comparative example, the generation of the leakage current IL is reduced (or preferably prevented). Therefore, as illustrated in detection signal waveforms G1A and G1B in FIG. 9(B) and as illustrated in FIG. 10(D), a decrease in the signal value of the detection signal Vdet with time is reduced or prevented. In addition, the detection signal waveform G1A corresponds to a waveform of the detection signal Vdet obtained from the common electrode 431 corresponding to a position P1A far from the detection circuit 8 in FIG. 9(A), and the detection signal waveform G1B corresponds to a waveform of the detection signal Vdet obtained from the common electrode 436 corresponding to a position P1B near the detection circuit 8. Moreover, periods Δt1A and Δt1B illustrated in FIG. 10 indicate periods in which common drive signals VcomA (corresponding to the position P1A far from the detection circuit 8) and VcomB (corresponding to the position P1B near the detection circuit 8) are applied, respectively. Further, in FIG. 9(B), arrows illustrated in the detection signal waveforms G1A and G1B indicate changes in waveform depending on whether a finger or not touches the sensor detection electrode 44.

Therefore, the A/D converter section 83 in the detection circuit 8 preferably reads out the detection signal Vdet at a saturation timing at which the value of the detection signal Vdet is saturated in response to the timing control signal CTL2 from the timing control section 9. For example, the saturation timing corresponds to sampling timings ts and ts1 to ts4 in FIGS. 9(B) and 10. Thereby, even if the gradient at the rising edge differs between the detection signal waveforms G1A and G1B due to a difference in time constant between the touched positions P1A and P1B, a substantially constant detection signal value V1A (=V1B) is obtained. In other words, when a position touched by an object is detected based on the detection signal Vdet read out at such a saturation timing (e.g., such as the sampling timing ts), position dependence on the touched position is reduced (or preferably prevented). In addition, such a saturation timing (e.g., such as the sampling timing ts) is set in advance based on panel characteristics of the display 1.

As described above, in the example embodiment, a position where the object touches (or comes close) is detected based on the detection signal Vdet obtained from the sensor detection electrode 44 in response to a change in capacitance, and in the detection circuit 8, the switch element SW1 is arranged between the signal line for the detection signal Vdet and the ground, so while the signal line for the detection signal Vdet is prevented from being floating to cause fluctuations in the detection signal Vdet, the generation of the leakage current is reduced, thereby a decrease in the range of the detection signal value or a decrease in the detection signal value with time is allowed to be reduced. Therefore, appropriate object detection is allowed to be performed in the display with the capacitive type touch sensor, and detection sensitivity is allowed to be improved.

Moreover, when the switch element SW1 turns on in synchronization with a timing immediately before the polarity-reversing timing of the common drive signal Vcom, the precharge is regularly performed, so the signal value of the detection signal Vdet is allowed to be prevented from exceeding the dynamic range of the readout circuit (e.g., such as the A/D converter section 83) due to disturbance noise or the like.

Further, the A/D converter section 83 in the detection circuit 8 reads out the detection signal Vdet at the saturation timing where the value of the detection signal Vdet is saturated, and a position where the object touches is detected based on the detection signal Vdet read out at such a saturation timing, so position dependence on the touched position is allowed to be reduced (or prevented).

FIG. 11 illustrates a schematic configuration of a display 1A with a touch sensor according to a second example embodiment of the disclosure. Moreover, FIG. 12 illustrates a timing waveform in a detection operation in the display 1A. The display 1A according to the example embodiment includes a detection circuit 8A instead of the detection circuit 8A of the display 1 according to the first example embodiment. In addition, in these drawings, like components are denoted by like numerals as of the above-described first example embodiment and will not be further described.

The detection circuit 8A is configured by further arranging a precharge power source 80 between the switch element SW1 and a ground in the detection circuit 8 to supply a predetermined precharge voltage Vp. For example, as illustrated in FIG. 12(D), the precharge power source 80 alternately outputs two precharge voltages V2 and V3 which are different from each other in a time-divisional manner in response to a timing control signal CTL3 from the timing control section 9 in synchronization with a polarity-reversing period of the common drive signal Vcom. In addition, periods Δt2A and Δt2B illustrated in FIG. 12 indicate periods in which common drive signals VcomA (corresponding to a position P2A far from the detection circuit 8A in FIG. 11(A)) and VcomB (corresponding to a position P2B near the detection circuit 8A in FIG. 11(A)) are applied, respectively.

Thereby, for example, as illustrated in FIG. 12(E), the signal line for the detection signal Vdet in the example embodiment is alternately precharged to the precharge voltage V2 (corresponding to tp11, tp13, tp21 and tp23) and the precharge voltage V3 (corresponding to tp12 and tp22). Therefore, compared to the detection signal Vdet (refer to FIG. 10(D)) in the above-described first example embodiment, the width of the detection signal value is reduced (for example, reduced to approximately a half the width of the detection signal Vdet in the first example embodiment).

As described above, in the example embodiment, the precharge power source 80 alternately outputting two different precharge voltage V2 and V3 in a time-divisional manner in synchronization with a polarity-reversing period of the common drive signal Vcom is further arranged between the switch element SW1 and the ground, so compared to the detection signal Vdet in the above-described first example embodiment, the width of the detection signal value is allowed to be reduced. Therefore, a dynamic range in a circuit in a subsequent stage (e.g., such as the A/D converter section 83) is allowed to be reduced, and an element with a small withstand voltage is allowed to be used.

<3. Third Example Embodiment>

Next, a third example embodiment of the disclosure will be described below. The third example embodiment includes a transverse electric mode liquid crystal element is used as a display element.

FIG. 13 illustrates a sectional view of a main part of a display 1B with a touch sensor according to the example embodiment, and FIG. 14 illustrates a perspective view thereof. In addition, in these drawings, like components are denoted by like numerals as of FIG. 4 in the above-described first example embodiment and will not be further described.

The display 1B according to the example embodiment includes a pixel substrate 2B, an opposed substrate 4B arranged to face the pixel substrate 2B and a liquid crystal layer 6 arranged between the pixel substrate 2B and the opposed substrate 4B.

The pixel substrate 2B includes the TFT substrate 21, the common electrode 43 arranged on the TFT substrate 21 and a plurality of pixel electrodes 22 arranged in a matrix form on the common electrode 43 with an insulating layer 23 in between. In the TFT substrate 21, in addition to a display driver and a TFT (both not illustrated) for driving each of the pixel electrodes 22, wires such as a source line for supplying a pixel signal to each of the pixel electrodes 22 and a gate line driving each TFT are formed. The detection circuit 8 (refer to FIG. 6) or the detection circuit 8A (refer to FIG. 11) performing a touch detection operation is also formed in the TFT substrate 21. The common electrode 43 doubles as a sensor drive electrode configuring a part of the touch sensor performing the touch detection operation, and corresponds to the drive electrode E1 in FIG. 1.

The opposed substrate 4B includes the glass substrate 41 and the color filter 42 formed on one surface of the glass substrate 41. The sensor detection electrode 44 is formed on the other surface of the glass substrate 41, and the polarizing plate 45 is arranged on the sensor detection electrode 44. The sensor detection electrode 44 configures a part of the touch sensor, and corresponds to the detection electrode E2 in FIG. 1. As illustrated in FIG. 5, the sensor detection electrode 44 is divided into a plurality of electrode patterns. The sensor detection electrode 44 may be formed directly or indirectly on the opposed substrate 4B by a thin film process. In this case, the touch detection electrode 44 may be formed on a film base (not illustrated), and the film base on which the touch detection electrode 44 is formed may be bonded to the surface of the opposed substrate 4B. In this case, the film base may be bonded to a top surface of the polarizing plate instead of between a glass and the polarizing plate, and may be formed in a film configuring a polarizing plate.

The common drive signal Vcom with an AC rectangular waveform is applied from the TFT substrate 21 to the common electrode 43. The common drive signal Vcom sets a display voltage of each pixel with a pixel voltage applied to the pixel electrodes 22, and the common drive signal Vcom doubles as a touch sensor drive signal, and corresponds to an AC rectangular wave Sg supplied from the drive signal source S in FIG. 1.

The liquid crystal layer 6 modulates light passing therethrough in response to an electric field state, and uses, for example, a transverse electric mode liquid crystal such as a FFS (Fringe Field Switching) mode or an IPS (In-Plane-Switching) mode.

For example, the configurations of the common electrode 43 in the pixel substrate 2B and the sensor detection electrode 44 in the opposed substrate 4B are the same as those illustrated in FIG. 5, and both of them are configured of a plurality of electrode patterns extending so as to intersect each other.

Now, more specific description will be given referring to FIG. 14. In a FFS mode liquid crystal element illustrated herein, the pixel electrodes 22 patterned into a comb-tooth shape is arranged on the common electrode 43, which is formed on the pixel substrate 2B, with the insulating layer 23 in between, and an alignment film 26 is formed so as to be laid over the pixel electrodes 22. A liquid crystal layer 6 is sandwiched between the alignment film 26 and an alignment film 46 on a side facing the opposed substrate 4B. Two polarizing plates 24 and 45 are arranged in a crossed Nicols state. The rubbing directions of two alignment films 26 and 46 coincide with one of transmission axes of two polarizing plates 24 and 45. In FIG. 14, the case where the rubbing direction coincides with the transmission axis of the polarizing plate 45 on an exit side is illustrated. Moreover, the rubbing directions of two alignment films 26 and 46 and the direction of the transmission axis of the polarizing plate 45 are set substantially in parallel to a direction where the pixel electrodes 22 extend (e.g., in a longitudinal direction of a comb tooth) in a range in which a direction where liquid crystal molecules are rotated is specified.

Next, functions and effects of the display 1B according to the example embodiment will be described below First, referring to FIGS. 14 and 15, a display operation principle of the FFS mode liquid crystal element will be briefly described below. Herein, FIG. 15 illustrates an enlarged sectional view of a main part of the liquid crystal element. In these drawings, (A) and (B) indicate a state of the liquid crystal element when an electric field is not applied and a state of the liquid crystal element when an electric field is applied, respectively.

In a state in which a voltage is not applied between the common electrode 43 and the pixel electrodes 22 (refer to FIGS. 14(A) and 15(A)), the axes of liquid crystal molecules 61 are orthogonal to the transmission axis of the polarizing plate 24 on an incident side, and are parallel to the transmission axis of the polarizing plate 45 on an exit side. Therefore, incident light h having passed through the polarizing plate 24 on the incident side reaches the polarizing plate 45 on the exit side without generating a phase difference in the liquid crystal layer 6 and then the incident light h is absorbed in the polarizing plate 45, so black is displayed. On the other hand, in a state in which a voltage is applied between the common electrode 43 and the pixel electrodes 22 (refer to FIGS. 14(B) and 15(B)), the alignment direction of the liquid crystal molecules 61 is rotated in a diagonal direction from the direction where the pixel electrodes 22 extend by a transverse electric field E generated between the pixel electrodes. At this time, electric field strength in white display is optimized so that the liquid crystal molecules 61 located in the center in a thickness direction of the liquid crystal layer 6 is rotated by approximately 45°. Thereby, in the incident light h having passing through the polarizing plate 24 on the incident side, a phase difference is generated while the light h passes through the liquid crystal layer 6, thereby the light h is turned into linear polarized light which is rotated by 90°, and passes through the polarizing plate 45 on the exit side, so white is displayed.

Next, a display control operation and a touch detection operation in the display 1B will be described below. These operations are the same as operations in the above-described first example embodiment, and will not be described in detail.

A display driver (not illustrated) of the pixel substrate 2B line-sequentially supplies the common drive signal Vcom to the electrode patterns of the common electrode 43. The display driver also supplies a pixel signal to the pixel electrodes 22 through the source line, and line-sequentially controls switching of TFTs of pixel electrodes through the gate line in synchronization with the supply of the pixel signal to the pixel electrodes 22. Thereby, an electric field in a transverse direction (e.g., a direction parallel to a substrate) determined by the common drive signal Vcom and each pixel signal is applied to the liquid crystal layer 6 in each pixel to modulate a liquid crystal state. Thus, display by a so-called reverse drive is performed.

On the other hand, on the opposed substrate 4B side, the common drive signal Vcom is sequentially applied to the electrode patterns of the common electrode 43 in a time-dimensional manner. Then, the capacitive elements C1 (C11 to C16) in one line formed at intersections of the electrode patterns of the common electrode 43 and the electrode patterns of the sensor detection electrode 44 are charged and discharged. Then, the detection signal Vdet with a magnitude according to the capacity value of the capacitive element C1 is outputted from each of the electrode patterns of the sensor detection electrode 44. In a state where a finger of a user does not touch a surface of the opposed substrate 4A, the magnitude of the detection signal Vdet is substantially uniform. When the finger of the user touches a position on the surface of the opposed substrate 4B, the capacitive element C2 by the finger is added to the capacitive element C1 originally formed in the touched position, and as a result, the value of the detection signal Vdet when the touched position is scanned is smaller than that when other positions are scanned. The detection circuit 8 (refer to FIG. 6) or the detection circuit 8A (refer to FIG. 11) compares the detection signal Vdet with the threshold voltage Vth to determine the position as a touched position in the case where the detection signal Vdet is smaller than the threshold voltage Vth. The touched position is determined based on a timing of applying the common drive signal Vcom and a timing of detecting the detection signal Vdet which is smaller than the threshold voltage Vth.

As described above, in the example embodiment, as in the case of the above-described first and second embodiments, the capacitive type touch sensor is configured so that the common electrode 43 originally included in the liquid crystal display element doubles as one of a pair of touch sensor electrodes configured of a drive electrode and a detection electrode, and the common drive signal Vcom as a display drive signal doubles as a touch sensor drive signal, so in the capacitive type touch sensor, only the sensor detection electrode 44 is additionally arranged, and it is not necessary to additionally prepare a touch sensor drive signal. Therefore, the configuration of the display 1B with the touch sensor is simple.

Moreover, also in the example embodiment, the detection circuit 8 described in the above-described first example embodiment or the detection circuit 8A described in the above-described second example embodiment is included, so the same effects as those in the above-described first or second example embodiment are obtainable by the same functions in the above-described first or second example embodiment.

In particular, in the example embodiment, the common electrode 43 as the touch sensor drive electrode is arranged on the pixel substrate 2B side (on the TFT substrate 21), so it is extremely easy to supply the common drive signal Vcom from the TFT substrate 21 to the common electrode 43, and a necessary circuit, a necessary electrode pattern, a necessary wire and the like are allowed to be centralized in the pixel substrate 2, thereby circuits are integrated. Therefore, a path (e.g., the contact conductive pillar 7) for supplying the common drive signal Vcom from the pixel substrate 2 to the opposed substrate 4 is not necessary, so the configuration of the display 1B with the touch sensor is further simplified.

In addition, the detection circuit 8 (refer to FIG. 6) or the detection circuit 8A (refer to FIG. 11) may be formed in a perimeter region (e.g., a non-display region or a frame region) on the opposed substrate 4B, but the detection circuit 8 or 8A is preferably formed in a perimeter region on the pixel substrate 2B. When the detection circuit 8 or 8A is formed on the pixel substrate 2B, the detection circuit 8 or 8A is integrated with various circuit elements for display control which are originally formed on the pixel substrate 2B.

In addition, in the example embodiment, the sensor detection electrode 44 is arranged on a surface (e.g., on a side opposite to a side facing the liquid crystal layer 6) of the glass substrate 41, but the arrangement of the sensor detection electrode 44 may be modified as follows.

For example, as in the case of a display 1C illustrated in FIG. 16, in an opposed substrate 4C, the sensor detection electrode 44 may be arranged on a side facing the liquid crystal layer 6 side but not on a side facing the color filter 42.

Alternatively, as in the case of a display 1D illustrated in FIG. 17, in an opposed substrate 4D, the sensor detection electrode 44 may be arranged between the glass substrate 41 and the color filter 42. In this case, in the case of the transverse electric mode, when electrodes are arranged in a longitudinal direction, an electric field is applied in the longitudinal direction, and liquid crystal molecules rise, thereby to cause large degradation in viewing angle or the like. Therefore, as in the case of the display 1D, when the sensor detection electrode 44 is arranged with a dielectric such as the color filter 42 in between, this issue is allowed to be greatly reduced.

<4. Modification Examples (Modification Examples 1 and 2)>

Next, modification examples (Modification Examples 1 and 2) for the above-described first to third example embodiments will be described below. In the above-described embodiments, as illustrated in FIG. 5, the case where the common electrode 43 and the sensor detection electrode 44 are configured of a plurality of electrode patterns extending so as to intersect each other is described, but the disclosure is not limited thereto. In addition, like components are denoted by like numerals as of the above-described first to third example embodiments, and will not be further described.

FIG. 18 illustrates a perspective view of a configuration of a main part (the common electrode and the sensor detection electrode) of a display with a touch sensor according to Modification Example 1. As illustrated in the drawing, the common electrode 43 may be configured of a single electrode (e.g., a first drive electrode), and the sensor detection electrode 44 may be configured of a plurality of individual electrodes arranged in a matrix form (e.g., a plurality of detection electrodes or first detection electrode, second detection electrode, third detection electrode, fourth detection electrode, etc.). In this case, the touched position is allowed to be immediately determined by the detection signal Vdet from each of individual electrodes of the sensor detection electrode 44.

FIG. 19 illustrates a perspective view of a configuration of a main part (the common electrode and the sensor detection electrode) of a display with a touch sensor according to Modification Example 2. As illustrated in the drawing, as in the case of FIG. 5, the common electrode 43 may be configured of a plurality of electrode patterns divided in a stripe shape (e.g., a plurality of drive electrodes or a first drive electrode, a second drive electrode, a third drive electrode a fourth drive electrode, a fifth drive electrode, a sixth drive electrode, etc.), and as in the case of FIG. 18, the sensor detection electrode 44 may be configured of a plurality of individual electrodes arranged in a matrix form (e.g., a plurality of detection electrodes or first detection electrode, second detection electrode, third detection electrode, fourth detection electrode, etc.). Also in this case, while the plurality of electrode patterns of the common electrode 43 are sequentially scanned by the common drive signal Vcom, detection is allowed to be performed.

<5. Application Examples>

Next, referring to FIGS. 20 to 24, application examples of the display with the touch sensor described in the above-described example embodiments and the above-described modification examples will be described below. The displays according to the above-described example embodiments and the like are applicable to electronic devices in any fields, such as televisions, digital cameras, notebook personal computers, portable terminal devices such as cellular phones, and video cameras. In other words, the displays according to the above-described example embodiments and the like are applicable to electronic devices displaying a picture signal inputted from outside or a picture signal produced inside as an image or a picture in any fields.

FIG. 20 illustrates an appearance of a television to which the display according to the above-described respective example embodiments and the like is applied. The television has, for example, a picture display screen section 510 including a front panel 511 and a filter glass 512. The picture display screen section 510 is configured of the display according to the above-described respective example embodiments and the like.

FIG. 21 illustrates appearances of a digital camera to which the display according to the above-described respective example embodiments and the like is applied. The digital camera has, for example, a light-emitting section for a flash 521, a display section 522, a menu switch 523, and a shutter button 524. The display section 522 is configured of the display according to the respective example embodiments and the like.

FIG. 22 illustrates an appearance of a notebook personal computer to which the display according to the above-described respective example embodiments and the like is applied. The notebook personal computer has, for example, a main body 531, a keyboard 532 for operation of inputting characters and the like, and a display section 533 for displaying an image. The display section 533 is configured of the display according to the above-described respective example embodiments and the like.

FIG. 23 illustrates an appearance of a video camera to which the display according to the above-described respective example embodiments and the like is applied. The video camera has, for example, a main body 541, a lens for shooting an object 542 arranged on a front surface of the main body 541, a shooting start/stop switch 543, and a display section 544. The display section 544 is configured of the display according to the above-described respective example embodiments and the like.

FIG. 24 illustrates appearances of a cellular phone to which the display according to the above-described respective example embodiments and the like is applied. The cellular phone is formed by connecting, for example, a top-side enclosure 710 and a bottom-side enclosure 720 to each other by a connection section (e.g., hinge section) 730. The cellular phone has a display 740, a sub-display 750, a picture light 760, and a camera 770. The display 740 or the sub-display 750 is configured of the display according to the above-described respective example embodiments and the like.

Although the present disclosure is described referring to the embodiments, the modification examples and the application examples, the disclosure is not limited thereto, and may be variously modified.

For example, in the above-described first example embodiment, the case where a ground voltage (ground; GND) is used as a precharge voltage when performing the precharge is described, but any fixed voltage (a fixed potential section) other than the ground voltage may be used. In other words, a precharge power source outputting one kind of fixed voltage as the precharge voltage Vp may be arranged between the switch element SW1 and the ground.

Moreover, in the above-described third example embodiment, as the transverse electric mode, the FFS mode liquid crystal element is described as an example, but an IPS mode liquid crystal is applicable in the same manner.

Further, in the above-described embodiments and the like, the display using the liquid crystal display element as the display element is described, but the disclosure is applicable to a display using any other display element, for example, an organic EL element.

In addition, in the above-described example embodiments and the like, the case where the touch sensor is embedded in the display (the display with the touch sensor) is described, but the touch sensor of the disclosure is not limited thereto, and, for example, the touch sensor (an external touch sensor) may be arranged outside the display. More specifically, for example, a touch sensor 10 illustrated in FIG. 25 may be arranged outside the display. The touch sensor 10 includes a pair of insulating substrates 411 and 412 made of, for example, glass, a sensor drive electrode (e.g., a touch drive electrode) 430 formed between the substrates 411 and 412, the sensor detection electrode 44 and an insulating layer 230. The sensor drive electrode 430 is formed on the insulating substrate 411, and a touch sensor drive signal is applied to the sensor drive electrode 430. The sensor detection electrode 44 is formed on the insulating substrate 412, and as in the case of the above-described example embodiments and the like, the sensor detection electrode 44 is an electrode for obtaining the detection signal Vdet. The insulating layer 230 is formed between the sensor drive electrode 430 and the sensor detection electrode 44. In addition, for example, a perspective configuration of the touch sensor 10 is the same as that in the above-described example embodiments and the like as illustrated in FIG. 5 or the like. Moreover, for example, the circuit configurations and the like of the drive signal source S, the detection circuit 8 and the timing control section 9 are the same as those in the above-described example embodiments and the like as illustrated in FIG. 6 or the like.

Moreover, in the above-described embodiments, the case where the timing control section 9 controls the switch element SW1 to turn on in synchronization with a timing immediately before a polarity-reversing timing of the common drive signal Vcom (for example, timings t1 to t4 in FIG. 10) is described, but as one modification example, the switch element SW1 may turn off in a period from the polarity-reversing timing to a sampling timing ts' (timings ts1' to ts4'), and may turn on in a period other than the aforementioned period. FIG. 26 is a timing waveform chart for describing a detection operation of a display according to a modification example. As in the case of FIGS. 10(A) and (B), periods Δt1A and Δt1B illustrated in FIGS. 26(A) and (B) indicate periods in which common drive signals VcomA and VcomB are applied, respectively. FIG. 26(C) indicates the timing control signal CTL1 supplied from the timing control section 9, and FIG. 26(D) indicates a detection signal waveform in the modification example. In the modification example, the detection signal Vdet is fixed to a predetermined potential in a period other than a detection period, so even in the case where image data for display is written to a signal line after the sampling timing ts', a stable detection waveform is obtained without influence of writing noise.

Further, the processes described in the above-described embodiments and the like may be performed by hardware or software. In the case where the processes are performed by software, a program forming the software is installed in a general-purpose computer or the like. Such a program may be stored in a recording medium mounted in the computer in advance.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A touch sensor apparatus, comprising:
   a first substrate;
   a plurality of pixel electrodes formed on the first substrate;
   a second substrate opposing the first substrate;
   a liquid crystal layer arranged between the first substrate and the second substrate,
   a first signal source generating a first drive signal;
   a first drive electrode receiving the first drive signal, the first drive electrode being disposed on a liquid crystal layer side of the second substrate;
   a first detection electrode disposed on an observer side of the second substrate, the observer side being opposite to the liquid crystal layer side of the second substrate;
   a dielectric material located between the first drive electrode and the first detection electrode defining a first capacitive area, wherein the first detection electrode generates a first output signal driven by the first drive signal;
   a detection circuit electrically connected to the first detection electrode, the detection circuit sensing the first output signal, the detection circuit including:
      a detection signal line connected to the first detection electrode;
      an amplification section that amplifies the first output signal;
      a switch element that is arranged between the detection signal line and a ground and that is arranged between the amplification section and the ground, and the switch element having a first state and a second state; and
      a control unit controls the switch element to turn on in synchronization with a timing immediately before a polarity-reversing timing of the first drive signal.

2. The touch sensor apparatus of claim 1, wherein the detection circuit determines a first detection result by comparing the first output signal to a signal threshold, the first detection result indicative of whether the first capacitive area was in a touch state.

3. The touch sensor apparatus of claim 2, further comprising:
   a second signal source generating a second drive signal; and
   a second drive electrode receiving the second drive signal from the second signal source;
   wherein the first detection electrode is located adjacent to the second drive electrode;
   wherein the dielectric material is located between the second drive electrode and the first detection electrode defining a second capacitive area;
   wherein the first detection electrode generates a second output signal driven by the second drive signal;
   wherein the detection circuit senses the second output signal; and
   wherein the detection circuit determines a second detection result by comparing the second output signal to the signal threshold, the second detection result indicative of whether the second capacitive area was in the touch state.

4. The touch sensor apparatus of claim 3, wherein:
   the first drive signal and the second drive signal are sequentially applied to the first drive electrode and the second drive electrode; and
   the first output signal and the second output signal are sequentially sensed with respect to the first drive signal and the second drive signal being sequentially applied.

5. The touch sensor apparatus of claim 4, wherein:
   a second detection electrode located adjacent to the first drive electrode and the second drive electrode;
   the dielectric material is located between the second detection electrode and the first drive electrode defining a third capacitive area, wherein the second detection electrode generates a third output signal driven by the first drive signal;

the dielectric material is located between the second detection electrode and the second drive electrode defining a fourth capacitive area, wherein the second detection electrode generates a fourth output signal driven by the second drive signal;

the detection circuit is electrically connected to the second detection electrode, the detection circuit sensing the third output signal and the fourth output signal;

the detection circuit determines a third detection result by comparing the third output signal to the signal threshold, the third detection result indicative of whether the third capacitive area was in the touch state; and the detection circuit determines a fourth detection result by comparing the fourth output signal to the signal threshold, the fourth detection result indicative of whether the fourth capacitive area was in the touch state.

6. The touch sensor apparatus of claim 5, wherein the first output signal, the second output signal, the third output signal, and the fourth output signal are sequentially sensed from the first detection electrode and the second detection electrode.

7. The touch sensor apparatus of claim 2, further comprising:

a second detection electrode located adjacent to the first drive electrode and displaced from the first detection electrode in a first direction;

a third detection electrode located adjacent to the first drive electrode and displaced from the first detection electrode in a second direction; and a fourth detection electrode located adjacent to the first drive electrode and displaced from the second detection electrode in the second direction and displaced from the third electrode in the first direction;

wherein the dielectric material is located between the first drive electrode and the second detection electrode defining a second capacitive area, the dielectric material is located between the first drive electrode and the third detection electrode defining a third capacitive area, and the dielectric material is located between the first drive electrode and the fourth detection electrode defining a fourth capacitive area;

wherein the second detection electrode generates a second output signal driven by the first drive signal;

wherein the third detection electrode generates a third output signal driven by the first drive signal;

wherein the fourth detection electrode generates a fourth output signal driven by the first drive signal;

wherein the detection circuit determines a second detection result by comparing the second output signal to the signal threshold, the second detection result indicative of whether the second capacitive area was in the touch state;

wherein the detection circuit determines a third detection result by comparing the third output signal to the signal threshold, the third detection result indicative of whether the third capacitive area was in the touch state; and wherein the detection circuit determines a fourth detection result by comparing the fourth output signal to the signal threshold, the fourth detection result indicative of whether the fourth capacitive area was in the touch state.

8. The touch sensor apparatus of claim 1, wherein the first detection electrode is part of a display.

9. The touch sensor apparatus of claim 1, wherein the first signal source is included in a display control circuit and the first drive electrode is a display common voltage electrode, such that the display control circuit controls a voltage applied between the display common voltage electrode and pixel electrodes so as to display an image based on an image signal, the display common voltage electrode receiving the first drive signal.

10. The touch sensor apparatus of claim 1, wherein the detection circuit is formed in a perimeter region on the first substrate and integrated with circuit elements for display control.

11. The touch sensor apparatus of claim 1, wherein the detection circuit includes at least one of the amplification section, a filter section, a rectification section, a smoothing section, an analog to digital converter section, a signal processing section, and a coordinate extraction section.

12. The touch sensor apparatus of claim 1, further comprising a precharge power source electrically connected to the switch element and providing the predefined voltage level, wherein the precharge power source sequentially provides a first predefined voltage level and a second predefined voltage level.

13. The touch sensor apparatus of claim 1, wherein the first detection electrode generates the first output signal driven by the first drive signal.

14. The touch sensor apparatus of claim 1, wherein according to a timing control signal which is in synchronization with the timing immediately before the polarity-reversing timing of the first drive signal, and the timing immediately before the first drive signal is supplied to the first drive electrode or synchronized with the timing immediately before the first drive signal is stopped, indicating a timing to alternatively switch between turned on and turned off, the switch element forces the first detection electrode to a ground voltage when the switch element is turned on, the switch element allows the first detection electrode to float when the switch element is turned off.

* * * * *